US011270291B2

(12) United States Patent
Ilincic

(10) Patent No.: US 11,270,291 B2
(45) Date of Patent: *Mar. 8, 2022

(54) SYSTEMS AND METHODS FOR DATA ACCESS CONTROL USING A SHORT-RANGE TRANSCEIVER

(71) Applicant: Capital One Services, LLC, McLean, VA (US)

(72) Inventor: Rajko Ilincic, Annandale, VA (US)

(73) Assignee: CAPITAL ONE SERVICES, LLC, McLean, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/088,117

(22) Filed: Nov. 3, 2020

(65) Prior Publication Data

US 2021/0342818 A1 Nov. 4, 2021

Related U.S. Application Data

(63) Continuation of application No. 16/863,952, filed on Apr. 30, 2020, now Pat. No. 10,861,006.

(51) Int. Cl.
*G06Q 20/34* (2012.01)
*G06Q 20/36* (2012.01)

(52) U.S. Cl.
CPC ......... *G06Q 20/352* (2013.01); *G06Q 20/341* (2013.01); *G06Q 20/3672* (2013.01); *G06Q 20/3674* (2013.01)

(58) Field of Classification Search
CPC ............... G06Q 20/352; G06Q 20/341; G06Q 20/3672; G06Q 20/3674
See application file for complete search history.

(56) References Cited

U.S. PATENT DOCUMENTS 4,683,553 A 7/1987 Mollier
4,827,113 A 5/1989 Rikuna
(Continued)

FOREIGN PATENT DOCUMENTS

CA 3010336 7/2017
CN 101192295 6/2008
(Continued)

OTHER PUBLICATIONS

Batina, Lejla and Poll, Erik, "SmartCards and RFID", Course PowerPoint Presentation for IPA Security Course, Digital Security at University of Nijmegen, Netherlands (date unknown) 75 pages.
(Continued)

*Primary Examiner* — Sonji N Johnson
(74) *Attorney, Agent, or Firm* — Hunton Andrews Kurth LLP

(57) ABSTRACT

Systems and methods for controlling data access through the interaction of a short-range transceiver, such as a contactless card, with a client device are presented. An exemplary system and method may include establishing a database storing information for a plurality of accounts, receiving from a client device of the second account holder an account link request to link a first account with a second account, the account link request generated in response to a tap action between a contactless card and the client device, transmitting to a client device of the first account holder a link approval request to approve the account link request, receiving from the first account holder client device, a link approval message generated in response to an indication by the first account holder approving the account link request, and transmitting to the second account holder client device an account link.

20 Claims, 9 Drawing Sheets

(56) References Cited

U.S. PATENT DOCUMENTS

| | | |
|---|---|---|
| 4,910,773 A | 3/1990 | Hazard et al. |
| 5,036,461 A | 7/1991 | Elliott et al. |
| 5,363,448 A | 11/1994 | Koopman, Jr. et al. |
| 5,377,270 A | 12/1994 | Koopman, Jr. et al. |
| 5,533,126 A | 7/1996 | Hazard |
| 5,537,314 A | 7/1996 | Kanter |
| 5,592,553 A | 1/1997 | Guski et al. |
| 5,616,901 A | 4/1997 | Crandall |
| 5,666,415 A | 9/1997 | Kaufman |
| 5,764,789 A | 6/1998 | Pare, Jr. et al. |
| 5,768,373 A | 6/1998 | Lohstroh et al. |
| 5,778,072 A | 7/1998 | Samar |
| 5,796,827 A | 8/1998 | Coppersmith et al. |
| 5,832,090 A | 11/1998 | Raspotnik |
| 5,883,810 A | 3/1999 | Franklin et al. |
| 5,901,874 A | 5/1999 | Deters |
| 5,929,413 A | 7/1999 | Gardner |
| 5,960,411 A | 9/1999 | Hartman et al. |
| 6,021,203 A | 2/2000 | Douceur et al. |
| 6,049,328 A | 4/2000 | Vanderheiden |
| 6,058,373 A | 5/2000 | Blinn et al. |
| 6,061,666 A | 5/2000 | Do et al. |
| 6,105,013 A | 8/2000 | Curry et al. |
| 6,199,114 B1 | 3/2001 | White et al. |
| 6,199,762 B1 | 3/2001 | Hohle |
| 6,216,227 B1 | 4/2001 | Goldstein et al. |
| 6,227,447 B1 | 5/2001 | Campisano |
| 6,282,522 B1 | 8/2001 | Davis et al. |
| 6,324,271 B1 | 11/2001 | Sawyer et al. |
| 6,342,844 B1 | 1/2002 | Rozin |
| 6,367,011 B1 | 4/2002 | Lee et al. |
| 6,402,028 B1 | 6/2002 | Graham, Jr. et al. |
| 6,438,550 B1 | 8/2002 | Doyle et al. |
| 6,501,847 B2 | 12/2002 | Helot et al. |
| 6,631,197 B1 | 10/2003 | Taenzer |
| 6,641,050 B2 | 11/2003 | Kelley et al. |
| 6,655,585 B2 | 12/2003 | Shinn |
| 6,662,020 B1 | 12/2003 | Aaro et al. |
| 6,721,706 B1 | 4/2004 | Strubbe et al. |
| 6,731,778 B1 | 5/2004 | Oda et al. |
| 6,779,115 B1 | 8/2004 | Naim |
| 6,792,533 B2 | 9/2004 | Jablon |
| 6,829,711 B1 | 12/2004 | Kwok et al. |
| 6,834,271 B1 | 12/2004 | Hodgson et al. |
| 6,834,795 B1 | 12/2004 | Rasmussen et al. |
| 6,852,031 B1 | 2/2005 | Rowe |
| 6,865,547 B1 | 3/2005 | Brake, Jr. et al. |
| 6,873,260 B2 | 3/2005 | Lancos et al. |
| 6,877,656 B1 | 4/2005 | Jaros et al. |
| 6,889,198 B2 | 5/2005 | Kawan |
| 6,905,411 B2 | 6/2005 | Nguyen et al. |
| 6,910,627 B1 | 6/2005 | Simpson-Young et al. |
| 6,971,031 B2 | 11/2005 | Haala |
| 6,990,588 B1 | 1/2006 | Yasukura |
| 7,006,986 B1 | 2/2006 | Sines et al. |
| 7,085,931 B1 | 8/2006 | Smith et al. |
| 7,127,605 B1 | 10/2006 | Montgomery et al. |
| 7,128,274 B2 | 10/2006 | Kelley et al. |
| 7,140,550 B2 | 11/2006 | Ramachandran |
| 7,152,045 B2 | 12/2006 | Hoffman |
| 7,165,727 B2 | 1/2007 | de Jong |
| 7,175,076 B1 | 2/2007 | Block et al. |
| 7,202,773 B1 | 4/2007 | Oba et al. |
| 7,206,806 B2 | 4/2007 | Pineau |
| 7,232,073 B1 | 6/2007 | de Jong |
| 7,246,752 B2 | 7/2007 | Brown |
| 7,254,569 B2 | 8/2007 | Goodman et al. |
| 7,263,507 B1 | 8/2007 | Brake, Jr. et al. |
| 7,270,276 B2 | 9/2007 | Vayssiere |
| 7,278,025 B2 | 10/2007 | Saito et al. |
| 7,287,692 B1 | 10/2007 | Patel et al. |
| 7,290,709 B2 | 11/2007 | Tsai et al. |
| 7,306,143 B2 | 12/2007 | Bonneau, Jr. et al. |
| 7,319,986 B2 | 1/2008 | Praisner et al. |
| 7,325,132 B2 | 1/2008 | Takayama et al. |
| 7,373,515 B2 | 5/2008 | Owen et al. |
| 7,374,099 B2 | 5/2008 | de Jong |
| 7,375,616 B2 | 5/2008 | Rowse et al. |
| 7,380,710 B2 | 6/2008 | Brown |
| 7,424,977 B2 | 9/2008 | Smets et al. |
| 7,453,439 B1 | 11/2008 | Kushler et al. |
| 7,472,829 B2 | 1/2009 | Brown |
| 7,487,357 B2 | 2/2009 | Smith et al. |
| 7,568,631 B2 | 8/2009 | Gibbs et al. |
| 7,584,153 B2 | 9/2009 | Brown et al. |
| 7,597,250 B2 | 10/2009 | Finn |
| 7,628,322 B2 | 12/2009 | Holtmanns et al. |
| 7,652,578 B2 | 1/2010 | Braun et al. |
| 7,689,832 B2 | 3/2010 | Talmor et al. |
| 7,703,142 B1 | 4/2010 | Wilson et al. |
| 7,748,609 B2 | 7/2010 | Sachdeva et al. |
| 7,748,617 B2 | 7/2010 | Gray |
| 7,748,636 B2 | 7/2010 | Finn |
| 7,762,457 B2 | 7/2010 | Bonalle et al. |
| 7,789,302 B2 | 9/2010 | Tame |
| 7,793,851 B2 | 9/2010 | Mullen |
| 7,796,013 B2 | 9/2010 | Murakami et al. |
| 7,801,799 B1 | 9/2010 | Brake, Jr. et al. |
| 7,801,829 B2 | 9/2010 | Gray et al. |
| 7,805,755 B2 | 9/2010 | Brown et al. |
| 7,809,643 B2 | 10/2010 | Phillips et al. |
| 7,827,115 B2 | 11/2010 | Weller et al. |
| 7,828,214 B2 | 11/2010 | Narendra et al. |
| 7,848,746 B2 | 12/2010 | Juels |
| 7,882,553 B2 | 2/2011 | Tuliani |
| 7,900,048 B2 | 3/2011 | Andersson |
| 7,908,216 B1 | 3/2011 | Davis et al. |
| 7,922,082 B2 | 4/2011 | Muscato |
| 7,933,589 B1 | 4/2011 | Mamdani et al. |
| 7,949,559 B2 | 5/2011 | Freiberg |
| 7,954,716 B2 | 6/2011 | Narendra et al. |
| 7,954,723 B2 | 6/2011 | Charrat |
| 7,962,369 B2 | 6/2011 | Rosenberg |
| 7,993,197 B2 | 8/2011 | Mamdani et al. |
| 8,005,426 B2 | 8/2011 | Huomo et al. |
| 8,010,405 B1 | 8/2011 | Bortolin et al. |
| RE42,762 E | 9/2011 | Shin |
| 8,041,954 B2 | 10/2011 | Plesman |
| 8,060,012 B2 | 11/2011 | Sklovsky et al. |
| 8,074,877 B2 | 12/2011 | Mullen et al. |
| 8,082,450 B2 | 12/2011 | Frey et al. |
| 8,095,113 B2 | 1/2012 | Kean et al. |
| 8,099,332 B2 | 1/2012 | Lemay et al. |
| 8,103,249 B2 | 1/2012 | Markison |
| 8,108,687 B2 | 1/2012 | Ellis et al. |
| 8,127,143 B2 | 2/2012 | Abdallah et al. |
| 8,135,648 B2 | 3/2012 | Oram et al. |
| 8,140,010 B2 | 3/2012 | Symons et al. |
| 8,141,136 B2 | 3/2012 | Lee et al. |
| 8,150,321 B2 | 4/2012 | Winter et al. |
| 8,150,767 B2 | 4/2012 | Wankmueller |
| 8,186,602 B2 | 5/2012 | Itay et al. |
| 8,196,131 B1 | 6/2012 | von Behren et al. |
| 8,215,563 B2 | 7/2012 | Levy et al. |
| 8,224,753 B2 | 7/2012 | Atef et al. |
| 8,232,879 B2 | 7/2012 | Davis |
| 8,233,841 B2 | 7/2012 | Griffin et al. |
| 8,245,292 B2 | 8/2012 | Buer |
| 8,249,654 B1 | 8/2012 | Zhu |
| 8,266,451 B2 | 9/2012 | Leydier et al. |
| 8,285,329 B1 | 10/2012 | Zhu |
| 8,302,872 B2 | 11/2012 | Mullen |
| 8,312,519 B1 | 11/2012 | Bailey et al. |
| 8,316,237 B1 | 11/2012 | Felsher et al. |
| 8,332,272 B2 | 12/2012 | Fisher |
| 8,365,988 B1 | 2/2013 | Medina, III et al. |
| 8,369,960 B2 | 2/2013 | Tran et al. |
| 8,371,501 B1 | 2/2013 | Hopkins |
| 8,381,307 B2 | 2/2013 | Cimino |
| 8,391,719 B2 | 3/2013 | Alameh et al. |
| 8,417,231 B2 | 4/2013 | Sanding et al. |
| 8,439,271 B2 | 5/2013 | Smets et al. |
| 8,475,367 B1 | 7/2013 | Yuen et al. |
| 8,489,112 B2 | 7/2013 | Roeding et al. |

(56) References Cited

U.S. PATENT DOCUMENTS

| | | |
|---|---|---|
| 8,511,542 B2 | 8/2013 | Pan |
| 8,559,872 B2 | 10/2013 | Butler |
| 8,566,916 B1 | 10/2013 | Vernon et al. |
| 8,567,670 B2 | 10/2013 | Stanfield et al. |
| 8,572,386 B2 | 10/2013 | Takekawa et al. |
| 8,577,810 B1 | 11/2013 | Dalit et al. |
| 8,583,454 B2 | 11/2013 | Beraja et al. |
| 8,589,335 B2 | 11/2013 | Smith et al. |
| 8,594,730 B2 | 11/2013 | Bona et al. |
| 8,615,468 B2 | 12/2013 | Varadarajan |
| 8,620,218 B2 | 12/2013 | Awad |
| 8,667,285 B2 | 3/2014 | Coulier et al. |
| 8,723,941 B1 | 5/2014 | Shirbabadi et al. |
| 8,726,405 B1 | 5/2014 | Bailey et al. |
| 8,740,073 B2 | 6/2014 | Vijayshankar et al. |
| 8,750,514 B2 | 6/2014 | Gallo et al. |
| 8,752,189 B2 | 6/2014 | De Jong |
| 8,794,509 B2 | 8/2014 | Bishop et al. |
| 8,799,668 B2 | 8/2014 | Cheng |
| 8,806,592 B2 | 8/2014 | Ganesan |
| 8,807,440 B1 | 8/2014 | Von Behren et al. |
| 8,811,892 B2 | 8/2014 | Khan et al. |
| 8,814,039 B2 | 8/2014 | Bishop et al. |
| 8,814,052 B2 | 8/2014 | Bona et al. |
| 8,818,867 B2 | 8/2014 | Baldwin et al. |
| 8,850,538 B1 | 9/2014 | Vernon et al. |
| 8,861,733 B2 | 10/2014 | Benteo et al. |
| 8,880,027 B1 | 11/2014 | Darringer |
| 8,888,002 B2 | 11/2014 | Chesney et al. |
| 8,898,088 B2 | 11/2014 | Springer et al. |
| 8,934,837 B2 | 1/2015 | Zhu et al. |
| 8,977,569 B2 | 3/2015 | Rao |
| 8,994,498 B2 | 3/2015 | Agrafioti et al. |
| 9,004,365 B2 | 4/2015 | Bona et al. |
| 9,038,894 B2 | 5/2015 | Khalid |
| 9,042,814 B2 | 5/2015 | Royston et al. |
| 9,047,531 B2 | 6/2015 | Showering et al. |
| 9,069,976 B2 | 6/2015 | Toole et al. |
| 9,081,948 B2 | 7/2015 | Magne |
| 9,104,853 B2 | 8/2015 | Mathur et al. |
| 9,118,663 B1 | 8/2015 | Bailey et al. |
| 9,122,964 B2 | 9/2015 | Krawczewicz |
| 9,129,280 B2 | 9/2015 | Bona et al. |
| 9,152,832 B2 | 10/2015 | Royston et al. |
| 9,203,800 B2 | 12/2015 | Izu et al. |
| 9,209,867 B2 | 12/2015 | Royston |
| 9,251,330 B2 | 2/2016 | Boivie et al. |
| 9,251,518 B2 | 2/2016 | Levin et al. |
| 9,258,715 B2 | 2/2016 | Borghei |
| 9,270,337 B2 | 2/2016 | Zhu et al. |
| 9,306,626 B2 | 4/2016 | Hall et al. |
| 9,306,942 B1 | 4/2016 | Bailey et al. |
| 9,324,066 B2 | 4/2016 | Archer et al. |
| 9,324,067 B2 | 4/2016 | Van Os et al. |
| 9,332,587 B2 | 5/2016 | Salahshoor |
| 9,338,622 B2 | 5/2016 | Bjontegard |
| 9,373,141 B1 | 6/2016 | Shakkarwar |
| 9,379,841 B2 | 6/2016 | Fine et al. |
| 9,406,011 B2 | 8/2016 | Bartenstein et al. |
| 9,413,430 B2 | 8/2016 | Royston et al. |
| 9,413,768 B1 | 8/2016 | Gregg et al. |
| 9,420,496 B1 | 8/2016 | Indurkar |
| 9,426,132 B1 | 8/2016 | Alikhani |
| 9,432,339 B1 | 8/2016 | Bowness |
| 9,455,968 B1 | 9/2016 | Machani et al. |
| 9,473,509 B2 | 10/2016 | Arsanjani et al. |
| 9,491,626 B2 | 11/2016 | Sharma et al. |
| 9,553,637 B2 | 1/2017 | Yang et al. |
| 9,619,952 B1 | 4/2017 | Zhao et al. |
| 9,635,000 B1 | 4/2017 | Muftic |
| 9,665,858 B1 | 5/2017 | Kumar |
| 9,674,705 B2 | 6/2017 | Rose et al. |
| 9,679,286 B2 | 6/2017 | Colnot et al. |
| 9,680,942 B2 | 6/2017 | Dimmick |
| 9,710,804 B2 | 7/2017 | Zhou et al. |
| 9,740,342 B2 | 8/2017 | Paulsen et al. |
| 9,740,988 B1 | 8/2017 | Levin et al. |
| 9,763,097 B2 | 9/2017 | Robinson et al. |
| 9,767,329 B2 | 9/2017 | Forster |
| 9,769,662 B1 | 9/2017 | Queru |
| 9,773,151 B2 | 9/2017 | Mil'shtein et al. |
| 9,780,953 B2 | 10/2017 | Gaddam et al. |
| 9,891,823 B2 | 2/2018 | Feng et al. |
| 9,940,571 B1 | 4/2018 | Herrington |
| 9,953,323 B2 | 4/2018 | Candelore et al. |
| 9,961,194 B1 | 5/2018 | Wiechman et al. |
| 9,965,756 B2 | 5/2018 | Davis et al. |
| 9,965,911 B2 | 5/2018 | Wishne |
| 9,978,058 B2 | 5/2018 | Wurmfeld et al. |
| 10,043,164 B2 | 8/2018 | Dogin et al. |
| 10,075,437 B1 | 9/2018 | Costigan et al. |
| 10,129,648 B1 | 11/2018 | Hernandez et al. |
| 10,133,979 B1 | 11/2018 | Eidam et al. |
| 10,217,105 B1 | 2/2019 | Sangi et al. |
| 10,706,400 B1* | 7/2020 | Puffer ................ G06Q 20/102 |
| 2001/0010723 A1 | 8/2001 | Pinkas |
| 2001/0029485 A1 | 10/2001 | Brody et al. |
| 2001/0034702 A1 | 10/2001 | Mockett et al. |
| 2001/0054003 A1 | 12/2001 | Chien et al. |
| 2002/0078345 A1 | 6/2002 | Sandhu et al. |
| 2002/0093530 A1 | 7/2002 | Krothapalli et al. |
| 2002/0100808 A1 | 8/2002 | Norwood et al. |
| 2002/0120583 A1 | 8/2002 | Keresman, III et al. |
| 2002/0152116 A1 | 10/2002 | Yan et al. |
| 2002/0153424 A1 | 10/2002 | Li |
| 2002/0165827 A1 | 11/2002 | Gien et al. |
| 2003/0023554 A1 | 1/2003 | Yap et al. |
| 2003/0034873 A1 | 2/2003 | Chase et al. |
| 2003/0055727 A1 | 3/2003 | Walker et al. |
| 2003/0078882 A1 | 4/2003 | Sukeda et al. |
| 2003/0167350 A1 | 9/2003 | Davis et al. |
| 2003/0208449 A1 | 11/2003 | Diao |
| 2004/0015958 A1 | 1/2004 | Veil et al. |
| 2004/0039919 A1 | 2/2004 | Takayama et al. |
| 2004/0127256 A1 | 7/2004 | Goldthwaite et al. |
| 2004/0215674 A1 | 10/2004 | Odinak et al. |
| 2004/0230799 A1 | 11/2004 | Davis |
| 2004/0235450 A1* | 11/2004 | Rosenberg ........... G06Q 20/327 |
| | | 455/406 |
| 2005/0044367 A1 | 2/2005 | Gasparini et al. |
| 2005/0075985 A1 | 4/2005 | Cartmell |
| 2005/0081038 A1 | 4/2005 | Arditti Modiano et al. |
| 2005/0138387 A1 | 6/2005 | Lam et al. |
| 2005/0156026 A1 | 7/2005 | Ghosh et al. |
| 2005/0160049 A1 | 7/2005 | Lundholm |
| 2005/0195975 A1 | 9/2005 | Kawakita |
| 2005/0247797 A1 | 11/2005 | Ramachandran |
| 2006/0006230 A1 | 1/2006 | Bear et al. |
| 2006/0040726 A1 | 2/2006 | Szrek et al. |
| 2006/0041402 A1 | 2/2006 | Baker |
| 2006/0044153 A1 | 3/2006 | Dawidowsky |
| 2006/0047954 A1 | 3/2006 | Sachdeva et al. |
| 2006/0085848 A1 | 4/2006 | Aissi et al. |
| 2006/0136334 A1 | 6/2006 | Atkinson et al. |
| 2006/0173985 A1 | 8/2006 | Moore |
| 2006/0174331 A1 | 8/2006 | Schuetz |
| 2006/0242698 A1 | 10/2006 | Inskeep et al. |
| 2006/0280338 A1 | 12/2006 | Rabb |
| 2007/0033642 A1 | 2/2007 | Ganesan et al. |
| 2007/0055630 A1 | 3/2007 | Gauthier et al. |
| 2007/0061266 A1 | 3/2007 | Moore et al. |
| 2007/0061487 A1 | 3/2007 | Moore et al. |
| 2007/0116292 A1 | 5/2007 | Kurita et al. |
| 2007/0118745 A1 | 5/2007 | Buer |
| 2007/0197261 A1 | 8/2007 | Humbel |
| 2007/0224969 A1 | 9/2007 | Rao |
| 2007/0241182 A1 | 10/2007 | Buer |
| 2007/0256134 A1 | 11/2007 | Lehtonen et al. |
| 2007/0258594 A1 | 11/2007 | Sandhu et al. |
| 2007/0278291 A1 | 12/2007 | Rans et al. |
| 2008/0008315 A1 | 1/2008 | Fontana et al. |
| 2008/0011831 A1 | 1/2008 | Bonalle et al. |
| 2008/0014867 A1 | 1/2008 | Finn |
| 2008/0035738 A1 | 2/2008 | Mullen |

(56) References Cited

U.S. PATENT DOCUMENTS

| | | |
|---|---|---|
| 2008/0071681 A1 | 3/2008 | Khalid |
| 2008/0072303 A1 | 3/2008 | Syed |
| 2008/0086767 A1 | 4/2008 | Kulkarni et al. |
| 2008/0103968 A1 | 5/2008 | Bies et al. |
| 2008/0109309 A1 | 5/2008 | Landau et al. |
| 2008/0110983 A1 | 5/2008 | Ashfield |
| 2008/0120711 A1 | 5/2008 | Dispensa |
| 2008/0156873 A1 | 7/2008 | Wilhelm et al. |
| 2008/0162312 A1 | 7/2008 | Sklovsky et al. |
| 2008/0164308 A1 | 7/2008 | Aaron et al. |
| 2008/0207307 A1 | 8/2008 | Cunningham II, et al. |
| 2008/0209543 A1 | 8/2008 | Aaron |
| 2008/0223918 A1 | 9/2008 | Williams et al. |
| 2008/0285746 A1 | 11/2008 | Landrock et al. |
| 2008/0308641 A1 | 12/2008 | Finn |
| 2009/0037275 A1 | 2/2009 | Pollio |
| 2009/0048026 A1 | 2/2009 | French |
| 2009/0132417 A1 | 5/2009 | Scipioni et al. |
| 2009/0143104 A1 | 6/2009 | Loh et al. |
| 2009/0171682 A1 | 7/2009 | Dixon et al. |
| 2009/0210308 A1 | 8/2009 | Toomer et al. |
| 2009/0235339 A1 | 9/2009 | Mennes et al. |
| 2009/0249077 A1 | 10/2009 | Gargaro et al. |
| 2009/0282264 A1 | 11/2009 | Amiel et al. |
| 2010/0023449 A1 | 1/2010 | Skowronek et al. |
| 2010/0023455 A1 | 1/2010 | Dispensa et al. |
| 2010/0029202 A1 | 2/2010 | Jolivet et al. |
| 2010/0033310 A1 | 2/2010 | Narendra et al. |
| 2010/0036769 A1 | 2/2010 | Winters et al. |
| 2010/0078471 A1 | 4/2010 | Lin et al. |
| 2010/0082491 A1 | 4/2010 | Rosenblatt et al. |
| 2010/0094754 A1 | 4/2010 | Bertran et al. |
| 2010/0095130 A1 | 4/2010 | Bertran et al. |
| 2010/0100480 A1 | 4/2010 | Altman et al. |
| 2010/0114731 A1 | 5/2010 | Kingston et al. |
| 2010/0192230 A1 | 7/2010 | Steeves et al. |
| 2010/0207742 A1 | 8/2010 | Buhot et al. |
| 2010/0211797 A1 | 8/2010 | Westerveld et al. |
| 2010/0240413 A1 | 9/2010 | He et al. |
| 2010/0257357 A1 | 10/2010 | McClain |
| 2010/0312634 A1 | 12/2010 | Cervenka |
| 2010/0312635 A1 | 12/2010 | Cervenka |
| 2011/0028160 A1 | 2/2011 | Roeding et al. |
| 2011/0035604 A1 | 2/2011 | Habraken |
| 2011/0060631 A1 | 3/2011 | Grossman et al. |
| 2011/0068170 A1 | 3/2011 | Lehman |
| 2011/0084132 A1 | 4/2011 | Tofighbakhsh |
| 2011/0101093 A1 | 5/2011 | Ehrensvard |
| 2011/0113245 A1 | 5/2011 | Varadrajan |
| 2011/0125638 A1 | 5/2011 | Davis et al. |
| 2011/0131415 A1 | 6/2011 | Schneider |
| 2011/0153437 A1 | 6/2011 | Archer et al. |
| 2011/0153496 A1 | 6/2011 | Royyuru |
| 2011/0208658 A1 | 8/2011 | Makhotin |
| 2011/0208965 A1 | 8/2011 | Machani |
| 2011/0211219 A1 | 9/2011 | Bradley |
| 2011/0218911 A1 | 9/2011 | Spodak |
| 2011/0238564 A1 | 9/2011 | Lim et al. |
| 2011/0246780 A1 | 10/2011 | Yeap et al. |
| 2011/0258452 A1 | 10/2011 | Coulier et al. |
| 2011/0280406 A1 | 11/2011 | Ma et al. |
| 2011/0282785 A1 | 11/2011 | Chin |
| 2011/0294418 A1 | 12/2011 | Chen |
| 2011/0312271 A1 | 12/2011 | Ma et al. |
| 2012/0024947 A1 | 2/2012 | Naelon |
| 2012/0030047 A1 | 2/2012 | Fuentes et al. |
| 2012/0030121 A1 | 2/2012 | Grellier |
| 2012/0047071 A1 | 2/2012 | Mullen et al. |
| 2012/0079281 A1 | 3/2012 | Lowenstein et al. |
| 2012/0109735 A1 | 5/2012 | Krawczewicz et al. |
| 2012/0109764 A1 | 5/2012 | Martin et al. |
| 2012/0143754 A1 | 6/2012 | Patel |
| 2012/0150737 A1 | 6/2012 | Rottink |
| 2012/0178366 A1 | 7/2012 | Levy et al. |
| 2012/0196583 A1 | 8/2012 | Kindo |
| 2012/0207305 A1 | 8/2012 | Gallo et al. |
| 2012/0209773 A1 | 8/2012 | Ranganathan |
| 2012/0238206 A1 | 9/2012 | Singh et al. |
| 2012/0239560 A1 | 9/2012 | Pourfallah et al. |
| 2012/0252350 A1 | 10/2012 | Steinmetz et al. |
| 2012/0254394 A1 | 10/2012 | Barras |
| 2012/0284194 A1 | 11/2012 | Liu et al. |
| 2012/0290472 A1 | 11/2012 | Mullen et al. |
| 2012/0296818 A1 | 11/2012 | Nuzzi et al. |
| 2012/0316992 A1 | 12/2012 | Obome |
| 2012/0317035 A1 | 12/2012 | Royyuru et al. |
| 2012/0317628 A1 | 12/2012 | Yeager |
| 2012/0331529 A1 | 12/2012 | Maximilian et al. |
| 2013/0005245 A1 | 1/2013 | Royston |
| 2013/0008956 A1 | 1/2013 | Ashfield |
| 2013/0026229 A1 | 1/2013 | Jarman et al. |
| 2013/0048713 A1 | 2/2013 | Pan |
| 2013/0054474 A1 | 2/2013 | Yeager |
| 2013/0065564 A1 | 3/2013 | Conner et al. |
| 2013/0080228 A1 | 3/2013 | Fisher |
| 2013/0080229 A1 | 3/2013 | Fisher |
| 2013/0099587 A1 | 4/2013 | Lou |
| 2013/0104251 A1 | 4/2013 | Moore et al. |
| 2013/0106576 A1 | 5/2013 | Hinman et al. |
| 2013/0119130 A1 | 5/2013 | Braams |
| 2013/0130614 A1 | 5/2013 | Busch-Sorensen |
| 2013/0144793 A1 | 6/2013 | Royston |
| 2013/0171929 A1 | 7/2013 | Adams et al. |
| 2013/0179351 A1 | 7/2013 | Wallner |
| 2013/0185772 A1 | 7/2013 | Jaudon et al. |
| 2013/0191279 A1 | 7/2013 | Caiman et al. |
| 2013/0200999 A1 | 8/2013 | Spodak et al. |
| 2013/0216108 A1 | 8/2013 | Hwang et al. |
| 2013/0226791 A1 | 8/2013 | Springer et al. |
| 2013/0226796 A1 | 8/2013 | Jiang et al. |
| 2013/0232082 A1 | 9/2013 | Krawczewicz et al. |
| 2013/0238894 A1 | 9/2013 | Ferg et al. |
| 2013/0282360 A1 | 10/2013 | Shimota et al. |
| 2013/0303085 A1 | 11/2013 | Boucher et al. |
| 2013/0304651 A1 | 11/2013 | Smith |
| 2013/0312082 A1 | 11/2013 | Izu et al. |
| 2013/0314593 A1 | 11/2013 | Reznik et al. |
| 2013/0344857 A1 | 12/2013 | Berionne et al. |
| 2014/0002238 A1 | 1/2014 | Taveau et al. |
| 2014/0019352 A1 | 1/2014 | Shrivastava |
| 2014/0027506 A1 | 1/2014 | Heo et al. |
| 2014/0032409 A1 | 1/2014 | Rosano |
| 2014/0032410 A1 | 1/2014 | Georgiev et al. |
| 2014/0040120 A1 | 2/2014 | Cho et al. |
| 2014/0040139 A1 | 2/2014 | Brudnicki et al. |
| 2014/0040147 A1 | 2/2014 | Varadarakan et al. |
| 2014/0047235 A1 | 2/2014 | Lessiak et al. |
| 2014/0067690 A1 | 3/2014 | Pitroda et al. |
| 2014/0074637 A1 | 3/2014 | Hammad |
| 2014/0074655 A1 | 3/2014 | Lim et al. |
| 2014/0081720 A1 | 3/2014 | Wu |
| 2014/0138435 A1 | 5/2014 | Khalid |
| 2014/0171034 A1 | 6/2014 | Aleksin et al. |
| 2014/0171039 A1 | 6/2014 | Bjontegard |
| 2014/0172700 A1 | 6/2014 | Teuwen et al. |
| 2014/0180851 A1 | 6/2014 | Fisher |
| 2014/0208112 A1 | 7/2014 | McDonald et al. |
| 2014/0214674 A1 | 7/2014 | Narula |
| 2014/0229375 A1 | 8/2014 | Zaytzsev et al. |
| 2014/0245391 A1 | 8/2014 | Adenuga |
| 2014/0256251 A1 | 9/2014 | Caceres et al. |
| 2014/0258099 A1 | 9/2014 | Rosano |
| 2014/0258113 A1 | 9/2014 | Gauthier et al. |
| 2014/0258125 A1 | 9/2014 | Gerber et al. |
| 2014/0274179 A1 | 9/2014 | Zhu et al. |
| 2014/0279479 A1 | 9/2014 | Maniar et al. |
| 2014/0337235 A1 | 11/2014 | Van Heerden et al. |
| 2014/0339315 A1 | 11/2014 | Ko |
| 2014/0346860 A1 | 11/2014 | Aubry et al. |
| 2014/0365780 A1 | 12/2014 | Movassaghi |
| 2014/0379361 A1 | 12/2014 | Mahadkar et al. |
| 2015/0012444 A1 | 1/2015 | Brown et al. |
| 2015/0032635 A1 | 1/2015 | Guise |
| 2015/0071486 A1 | 3/2015 | Rhoads et al. |

(56) References Cited

U.S. PATENT DOCUMENTS

| | | |
|---|---|---|
| 2015/0088757 A1 | 3/2015 | Zhou et al. |
| 2015/0089586 A1 | 3/2015 | Ballesteros |
| 2015/0134452 A1 | 5/2015 | Williams |
| 2015/0140960 A1 | 5/2015 | Powell et al. |
| 2015/0154595 A1 | 6/2015 | Collinge et al. |
| 2015/0170138 A1 | 6/2015 | Rao |
| 2015/0178724 A1 | 6/2015 | Ngo et al. |
| 2015/0178725 A1* | 6/2015 | Poetsch ............... G06Q 20/405 705/44 |
| 2015/0186871 A1 | 7/2015 | Laracey |
| 2015/0205379 A1 | 7/2015 | Mag et al. |
| 2015/0271200 A1 | 9/2015 | Shane et al. |
| 2015/0302409 A1 | 10/2015 | Malek |
| 2015/0317626 A1 | 11/2015 | Ran et al. |
| 2015/0332266 A1 | 11/2015 | Friedlander et al. |
| 2015/0339474 A1 | 11/2015 | Paz et al. |
| 2015/0371234 A1 | 12/2015 | Huang et al. |
| 2016/0012465 A1 | 1/2016 | Sharp |
| 2016/0019536 A1* | 1/2016 | Ortiz ............... G06Q 20/3227 705/67 |
| 2016/0026997 A1 | 1/2016 | Tsui et al. |
| 2016/0048913 A1 | 2/2016 | Rausaria et al. |
| 2016/0055480 A1 | 2/2016 | Shah |
| 2016/0057619 A1 | 2/2016 | Lopez |
| 2016/0065370 A1 | 3/2016 | Le Saint et al. |
| 2016/0087957 A1 | 3/2016 | Shah et al. |
| 2016/0092696 A1 | 3/2016 | Guglani et al. |
| 2016/0148193 A1 | 5/2016 | Kelley et al. |
| 2016/0232523 A1 | 8/2016 | Venot et al. |
| 2016/0239672 A1 | 8/2016 | Khan et al. |
| 2016/0253651 A1 | 9/2016 | Park et al. |
| 2016/0255072 A1 | 9/2016 | Liu |
| 2016/0267486 A1 | 9/2016 | Mitra et al. |
| 2016/0277383 A1 | 9/2016 | Guyomarc'h et al. |
| 2016/0277388 A1 | 9/2016 | Lowe et al. |
| 2016/0307187 A1 | 10/2016 | Guo et al. |
| 2016/0307189 A1 | 10/2016 | Zarakas et al. |
| 2016/0314472 A1 | 10/2016 | Ashfield |
| 2016/0330027 A1 | 11/2016 | Ebrahimi |
| 2016/0335531 A1 | 11/2016 | Mullen et al. |
| 2016/0379217 A1 | 12/2016 | Hammad |
| 2017/0004502 A1 | 1/2017 | Quentin et al. |
| 2017/0011395 A1 | 1/2017 | Pillai et al. |
| 2017/0011406 A1 | 1/2017 | Tunnell et al. |
| 2017/0017957 A1 | 1/2017 | Radu |
| 2017/0017964 A1 | 1/2017 | Janefalkar et al. |
| 2017/0024716 A1 | 1/2017 | Jiam et al. |
| 2017/0039566 A1 | 2/2017 | Schipperheijn |
| 2017/0041759 A1 | 2/2017 | Gantert et al. |
| 2017/0068950 A1 | 3/2017 | Kwon |
| 2017/0103388 A1 | 4/2017 | Pillai et al. |
| 2017/0104739 A1 | 4/2017 | Lansler et al. |
| 2017/0109509 A1 | 4/2017 | Baghdasaryan |
| 2017/0109730 A1 | 4/2017 | Locke et al. |
| 2017/0116447 A1 | 4/2017 | Cimino et al. |
| 2017/0124568 A1 | 5/2017 | Moghadam |
| 2017/0140379 A1 | 5/2017 | Deck |
| 2017/0154328 A1 | 6/2017 | Zarakas et al. |
| 2017/0154333 A1 | 6/2017 | Gleeson et al. |
| 2017/0180134 A1 | 6/2017 | King |
| 2017/0230189 A1 | 8/2017 | Toll et al. |
| 2017/0237301 A1 | 8/2017 | Elad et al. |
| 2017/0289127 A1 | 10/2017 | Hendrick |
| 2017/0295013 A1 | 10/2017 | Claes |
| 2017/0316696 A1 | 11/2017 | Bartel |
| 2017/0317834 A1 | 11/2017 | Smith et al. |
| 2017/0330173 A1 | 11/2017 | Woo et al. |
| 2017/0374070 A1 | 12/2017 | Shah et al. |
| 2018/0034507 A1 | 2/2018 | Wobak et al. |
| 2018/0039986 A1 | 2/2018 | Essebag et al. |
| 2018/0068316 A1 | 3/2018 | Essebag et al. |
| 2018/0129945 A1 | 5/2018 | Saxena et al. |
| 2018/0160255 A1 | 6/2018 | Park |
| 2018/0191501 A1 | 7/2018 | Lindemann |
| 2018/0205712 A1 | 7/2018 | Versteeg et al. |
| 2018/0240106 A1 | 8/2018 | Garrett et al. |
| 2018/0254909 A1 | 9/2018 | Hancock |
| 2018/0268132 A1 | 9/2018 | Buer et al. |
| 2018/0270214 A1 | 9/2018 | Caterino et al. |
| 2018/0294959 A1 | 10/2018 | Traynor et al. |
| 2018/0300716 A1 | 10/2018 | Carlson |
| 2018/0302396 A1 | 10/2018 | Camenisch et al. |
| 2018/0315050 A1 | 11/2018 | Hammad |
| 2018/0316666 A1 | 11/2018 | Koved et al. |
| 2018/0322486 A1 | 11/2018 | Deliwala et al. |
| 2018/0359100 A1 | 12/2018 | Gaddam et al. |
| 2019/0014107 A1 | 1/2019 | George |
| 2019/0019375 A1 | 1/2019 | Foley |
| 2019/0036678 A1 | 1/2019 | Ahmed |
| 2019/0238517 A1 | 8/2019 | D'Agostino et al. |
| 2019/0392416 A1 | 12/2019 | Bernholc |
| 2020/0104833 A1 | 4/2020 | Rule et al. |

FOREIGN PATENT DOCUMENTS

| | | |
|---|---|---|
| CN | 103023643 | 4/2013 |
| CN | 103417202 | 12/2013 |
| EP | 1 085 424 | 3/2001 |
| EP | 1 223 565 | 7/2002 |
| EP | 1 265 186 | 12/2002 |
| EP | 1 783 919 | 5/2007 |
| EP | 2 852 070 | 1/2009 |
| EP | 2 139 196 | 12/2009 |
| EP | 1 469 419 | 2/2012 |
| GB | 2 457 221 | 8/2009 |
| GB | 2 516 861 | 2/2015 |
| GB | 2 551 907 | 1/2018 |
| KR | 101508320 | 4/2015 |
| WO | WO 00/49586 | 8/2000 |
| WO | WO 2006070189 | 7/2006 |
| WO | WO 2008055170 | 5/2008 |
| WO | WO 2009025605 | 2/2009 |
| WO | WO 2010049252 | 5/2010 |
| WO | WO 2011112158 | 9/2011 |
| WO | WO 2012001624 | 1/2012 |
| WO | WO 2013039395 | 3/2013 |
| WO | WO 2013155562 | 10/2013 |
| WO | WO 2013192358 | 12/2013 |
| WO | WO 2014043278 | 3/2014 |
| WO | WO 2014170741 | 10/2014 |
| WO | WO 2015179649 | 11/2015 |
| WO | WO 2015183818 | 12/2015 |
| WO | WO 2016097718 | 6/2016 |
| WO | WO 2016160816 | 10/2016 |
| WO | WO 2016168394 | 10/2016 |
| WO | WO 2017042375 | 3/2017 |
| WO | WO 2017042400 | 3/2017 |
| WO | WO 2017157859 | 9/2017 |
| WO | WO 2017208063 | 12/2017 |
| WO | WO 2018063809 | 4/2018 |
| WO | WO 2018137888 | 8/2018 |

OTHER PUBLICATIONS

Haykin M. and Warnar, R., "Smart Card Technology: New Methods for Computer Access Control," Computer Science and Technology NIST Special Publication 500-157:1-60 (1988).

Lehpamer, Harvey, "Component of the RFID System," RFID Design Principles, 2nd edition pp. 133-201 (2012).

Pourghomi, Pardis et al., "A Proposed NFC Payment Application," International Journal of Advanced Computer Science and Applications, vol. 4, No. 8, 2013.

Author Unknown, "CardrefresherSM from American Express®," [online] 2019 [retrieved on Mar. 25, 2019]. Retrieved from Internet URL: https://merchant-channel.americanexpress.com/merchant/en_US/cardrefresher, 2 pages.

Author Unknown, "Add Account Updater to your recurring payment tool," [online] 2018-19 [retrieved on Mar. 25, 2019], Retrieved from Internet URL: https://www.authorize.net/our-features/account-updater/, 5 pages.

Author Unknown, "Visa® Account Updater for Merchants," [online] 2019 [retrieved on Mar. 25, 2019]. Retrieved from Internet URL:

(56) References Cited

OTHER PUBLICATIONS https://usa.visa.com/dam/VCOM/download/merchants/visa-account-updater-product-information-fact-sheet-for-merchants.pdf, 2 pages.

Author Unknown, "Manage the cards that you use with Apple Pay," Apple Support [online] 2019 [retrieved on Mar. 25, 2019]. Retrieved from Internet URL: https://support.apple.com/en-us/HT205583, 5 pages.

Author Unknown, "Contactless Specifications for Payment Systems," EMV Book B—Entry Point Specification [online] 2016 [retrieved on Mar. 25, 2019]. Retrieved from Internet URL: https://www.emvco.com/wp-content/uploads/2017/05/BookB_Entry_Point_Specification_v2_6_20160809023257319.pdf, 52 pages.

Author Unknown, "EMV Integrated Circuit Card Specifications for Payment Systems, Book 2, Security and Key Management," Version 3.4, [online] 2011 [retrieved on Mar. 25, 2019], Retrieved from Internet URL: https://www.emvco.com/wp-content/uploads/2017/05/EMV_v4.3_Book_2_Security_and_Key_Management_20120607061923900.pdf, 174 pages.

Author unknown, "NFC Guide: All You Need to Know About Near Field Communication" Square Guide [online] 2018 [retrieved on Nov. 13, 2018], Retrieved from Internet URL: https://squareup.com/guides/nfc, 8 pages.

Profis, S., "Everything you need to know about NFC and mobile payments" CNET Directory [online], 2014 [retrieved on Mar. 25, 2019]. Retrieved from the Internet URL: https://www.cnet.com/how-to/how-nfc-works-and-mobile-payments/, 6 pages.

Cozma, N., "Copy data from other devices in Android 5.0 Lollipop setup" CNET Directory [online] 2014 [retrieved on Mar. 25, 2019]. Retrieved from the Internet URL: https://www.cnet.com/how-to/copy-data-from-other-devices-in-android-5-0-lollipop-setup/, 5 pages.

Kevin, Android Enthusiast, "How to copy text string from nfc tag" StackExchange [online] 2013 [retrieved on Mar. 25, 2019]. Retrieved from the Internet URL: https://android.stackexchange.com/questions/55689/how-to-copy-text-string-from-nfc-tag, 11 pages.

Author unknown, "Tap & Go Device Setup" Samsung [online] date unknown [retrieved on Mar. 25, 2019]. Retrieved from the Internet URL: https://www.samsung.com/us/switch-me/switch-to-the-galaxy-s-5/app/partial/setup-device/tap-go.html, 1 page.

Author Unknown, "Multiple encryption", Wikipedia [online] 2019 [retrieved on Mar. 25, 2019]. Retrieved from Internet URL: https://en.wikipedia.org/wiki/Multiple_encryption, 4 pages.

Krawczyk, et al., "HMAC: Keyed-Hashing for Message Authentication", Network Working Group RFC:2104 memo [online] 1997 [retrieved on Mar. 25, 2019]. Retrieved from Internet URL: https://tools.ietf.org/html/rfc2104, 12 pages.

Song, et al., "The AES—CMAC Algorithm", Network Working Group RFC: 4493 memo [online] 2006 [retrieved on Mar. 25, 2019]. Retrieved from Internet URL: https://tools.ietf.org/html/rfc4493, 21 pages.

Katz, J., and Lindell, Y., "Aggregate Message Authentication Codes", Topics in Cryptology [online] 2008 [retrieved on Mar. 25, 2019]. Retrieved from Internet URL: https://www.cs.nmd.edu/~jkatz/papers/aggregateMAC.pdf, 11 pages.

Adams, D., and Maier, A-K, "Goldbug BIG SEVEN open source crypto-messengers to be compared —: or Comprehensive Confidentiality Review & Audit of GoldBug Encrypting E-Mail-Client & Secure Instant Messenger", Big Seven Study 2016 [online] [retrieved on Mar. 25, 2018]. Retrieved from Internet URL: https://sf.net/projects/goldbug/files/bigseven-crypto-audit.pdf, 309 pages.

Author Unknown, "Triple DES", Wikipedia [online] 2018 [retrieved on Mar. 25, 2019]. Retrieved from Internet URL: https://simple.wikipedia.org/wiki/Triple_DES, 2 pages.

Song, F., and Yun, A.I, "Quantum Security of NMAC and Related Constructions—PRF domain extension against quantum attacks", IACR Cryptology ePrint Archive [online] 2017 [retrieved on Mar. 25, 2019]. Retrieved from Internet URL: https://eprint.iacr.org/2017/509.pdf, 41 pages.

Saxena, N., "Lecture 10: NMAC, HMAC and Number Theory", CS 6903 Modern Cryptography [online] 2008 [retrieved on Mar. 25, 2019]. Retrieved from Internet URL: http://isis.poly.edu/courses/cs6903/Lectures/lecture10.pdf, 8 pages.

Berg, Guy, "Fundamentals of EMV" Smart Card Alliance [online] date unknown [retrieved on Mar. 27, 2019]. Retrieved from Internet URL: https://www.securetechalliance.org/resources/media/scapl3_preconference/02.pdf, 37 pages.

Pierce, Kevin, "Is the amazon echo NFC compatible,?" Amazon.com Customer Q&A [online] 2016 [retrieved on Mar. 26, 2019]. Retrieved from Internet URL: https://www.amazon.com/ask/questions/Tx1RJXYSPE6XLJD?_encodi..., 2 pages.

Author Unknown, "Multi-Factor Authentication", idaptive [online] 2019 [retrieved on Mar. 25, 2019]. Retrieved from Internet URL: https://www.centrify.com/products/application-services/adaptive-multi-factor-authentication/risk-based-mfa/, 10 pages.

Author Unknown, "Adaptive Authentication", SecureAuth [online] 2019 [retrieved on Mar. 25, 2019}. Retrieved from Internet URL: https://www.secureauth.com/products/access-management/adaptive-authentication, 7 pages.

Van den Breekel, J., et al., "EMV in a nutshell", Technical Report, 2016 [retrieved on Mar. 25, 2019]. Retrieved from Internet URL: https://www.cs.ru.nl/E.Poll/papers/EMVtechreport.pdf, 37 pages.

Author Unknown, "Autofill", Computer Hope [online] 2018 [retrieved on Mar. 25, 2019]. Retrieved from Internet URL: https://www.computerhope.com/jargon/a/autofill.htm, 2 pages.

Author Unknown, "Fill out forms automatically", Google Chrome Help [online] 2019 [retrieved on Mar. 25, 2019], Retrieved from Internet URL: https://support.google.com/chrome/answer/142893?co=GENIE.Platform%3DDesktop&hl=en, 3 pages.

Author unknown, "Autofill credit cards, contacts, and passwords in Safari on Mac", Apple Safari User Guide [online] 2019 [retrieved on Mar. 25, 2019]. Retrieved from Internet URL: https://support.apple.com/guide/safari/use-autofill-ibrw1103/mac, 3 pages.

Menghin, M.J., "Power Optimization Techniques for Near Field Communication Systems" 2014 Dissertation at Technical University of Graz [online]. Retrieved from Internet URL: https://diglib.tugraz.at/download.php?id-576a7b910d2d6&location=browse, 135 pages.

Mareli, M., et al., "Experimental evaluation of NFC reliability between an RFID tag and a smartphone" Conference paper (2013) IEEE AFRICON At Mauritius [online] [retrieved on Mar. 25, 2019]. Retrieved from Internet URL: https://core.ac.uk/download/pdf/54204839.pdf, 5 pages.

Davison, A., et al., "MonoSLAM: Real-Time Single Camera SLAM", IEEE Transactions on Pattern Analysis and Machine Intelligence 29(6): 1052-1067 (2007).

Barba, R., "Sharing your location with your bank sounds creepy, but it's also useful", Bankrate, LLC [online] 2017 [retrieved on Mar. 25, 2019]. Retrieved from Internet URL: https://www.bankrate.com/banking/banking-app-location-sharing/, 6 pages.

Author unknown: "onetappayment™", [online] Jan. 24, 2019, [retrieved on Mar. 25, 2019]. Retrieved from Internet URL: https://www.payubiz.in/onetap, 4 pages.

Vu et al., (2012). "Distinguishing users with capacitive touch communication" Proceedings of the Annual International Conference on Mobile Computing and Networking, MOBICOM. 10.1145/2348543.2348569.

EMVCo, EMV Card Personalization Specification, version 1.0 (Jun. 2003), 81 pages.

Ullmann et al., (2012). "On-Card" User Authentication for Contactless Smart Cards based on Gesture Recognition, LNI, 223-234, 12 pages.

Faraj et al. (2008). "Investigation of Java Smart Card Technology for Multi-Task Applications" J. of Al-Anbar University for Pure Science, vol. 2: No. 1: 2008, 11 pages.

Dhamdhere (2017) "Key Benefits of a Unified Platform for Loyalty, Referral Marketing, and UGC" Annex Cloud [retrieved on Jul. 3, 2019]. Retrieved from Internet URL: https://www.annexcloude.com/blog/benefits-unified-platform/, 13 pages.

European Extended Search Report issued in related European Patent Application No. EP 21156457.0, dated Jun. 21, 2021.

\* cited by examiner

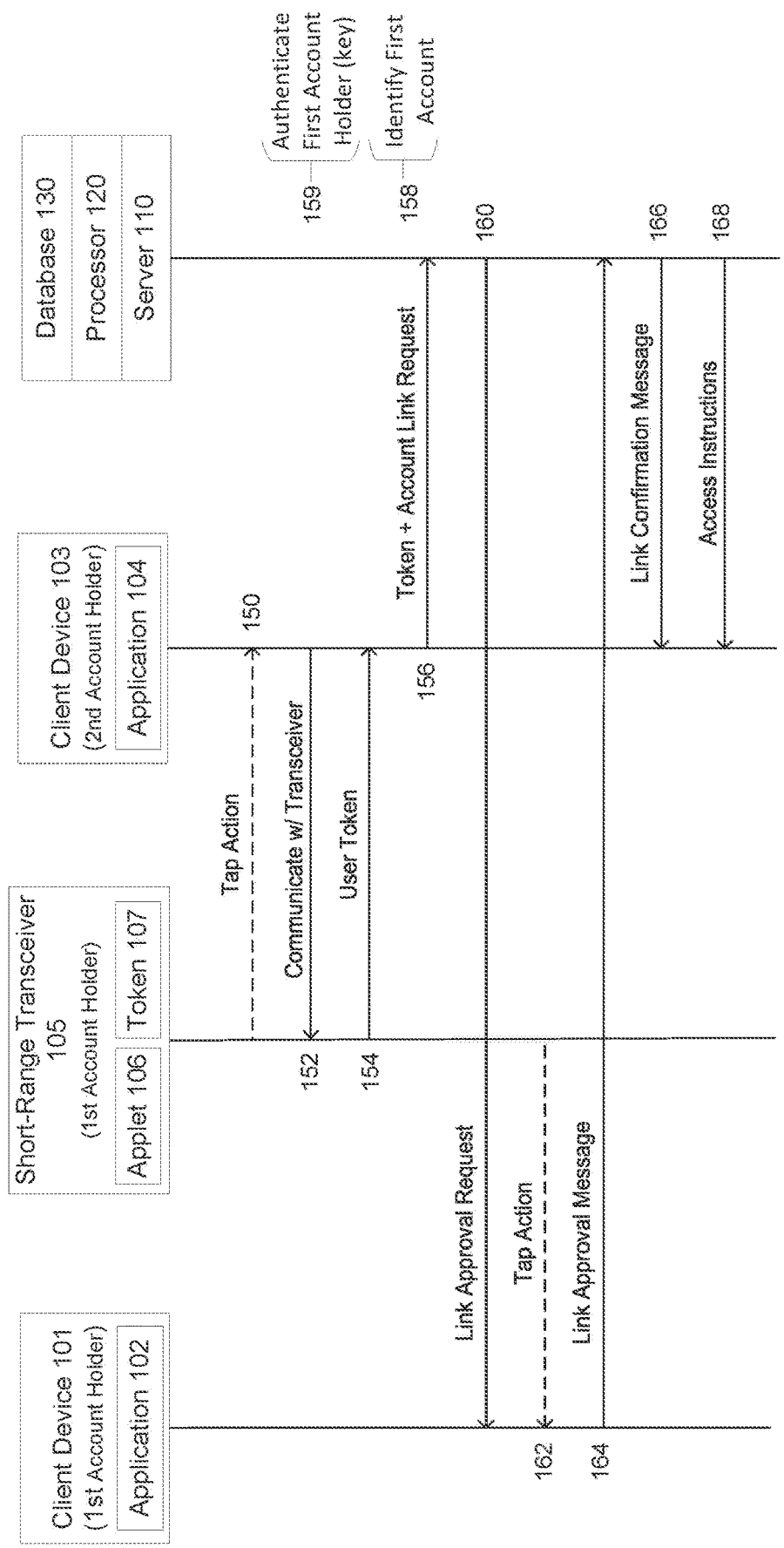

SYSTEMS AND METHODS FOR DATA ACCESS CONTROL USING A SHORT-RANGE TRANSCEIVER

CROSS REFERENCE TO RELATED APPLICATION

This application is a continuation of U.S. patent application Ser. No. 16/863,952 filed Apr. 30, 2020, the complete disclosure of which is incorporated herein by reference in its entirety.

FIELD OF THE DISCLOSURE

The present disclosure relates generally to user data control and, more specifically, to an exemplary system and method for active control of user access to data through the interaction of a short-range transceiver with a client device.

BACKGROUND

A typical user has multiple different accounts with one or more entities. When a user creates an account, the user will generally provide a certain amount of personal, identifying information regarding the user, as well as information for account access such as a username and password. Each entity may have, for example, different user data retention policies, different use policies, and different user data sharing policies. The policies of using user-information may further change without any notification to the user. In addition, the possessor of the user information may also change through a merger or buy-out of one entity by another, many times without any notice to the user.

Account access will often rely on log-in credentials (e.g., username and password) to confirm a cardholder's identity. However, if the log-in credentials are compromised, another person could have access to the user's account. In addition, the more entities or individuals that a user shares their personal information with, the greater the risk of the user's information being stolen by a breach at one of the entities. Further, a user may only desire to share certain pieces of personal information with an entity or individual for limited purposes or limited in time.

Thus, it may be beneficial to provide exemplary systems and methods which allow users to control the use of user information to overcome at least some of the deficiencies described herein.

SUMMARY

Aspects of the disclosed technology include systems and methods for controlling data access through the interaction of a short-range transceiver, such as a contactless card, with a client device. Data access control may be provided in the context of account information, including handling requests to link a first account with a second account, via the interaction of a short-range transceiver, such as a contactless card, with a client device such that disclosure of certain account identifier information, or account login information, need not be disclosed to individuals or entities requesting access to account data of another individual or entity.

Embodiments of the present disclosure provide a data access control system, comprising: a database storing information for a plurality of accounts comprising, for a first account associated with a first account holder, a first account identifier and first account data, and, for a second account associated with a second account holder, a second account identifier; a server configured to communicate over a network with a plurality of client devices, including a first client device associated with the first account holder and a second client device associated with the second account holder; a contactless card comprising a communications interface, a processor, and a memory, the memory storing an applet and a token, wherein the contactless card is associated with the first account holder; a client application comprising instructions for execution on at least one of the first client device or the second client device, the client application configured to: when executed on the second client device: in response to a tap action between the contactless card and the second client device: receive the token from the contactless card, and transmit to the server the token and an account link request to link the first account with the second account; and receive from the server an account link confirmation message including instructions for access to the first account data; and, when executed on the first client device: in response to a link approval request from the server to approve the account link request, transmit to the server a link approval message approving the account link request; and, a processor in data communication with the server and the database, the processor configured to: receive from the second client device the token and the account link request; identify the first account based on the token; transmit to the first client device the link approval request to approve the account link request; receive from the first client device the link approval message approving the account link request; and transmit to the second client device the account link confirmation message including instructions for access to the first account data.

Embodiments of the present disclosure provide a method for controlling data access, comprising: establishing a database storing information for a plurality of accounts comprising, for a first account associated with a first account holder, a first account identifier, first account data and data control parameters, and, for a second account associated with a second account holder, a second account identifier; receiving from a client device of the second account holder, via a network, an account link request to link the first account with the second account, the account link request generated in response to a tap action between a contactless card and the second account holder client device, the account link request accompanied by a token stored on the contactless card, wherein the contactless card is associated with the first account holder; identifying the first account based on the token; transmitting to a client device of the first account holder, via the network, a link approval request to approve the account link request; receiving from the first account holder client device, via the network, a link approval message, the link approval message generated in response to an indication by the first account holder approving the account link request; and transmitting to the second account holder client device, via the network, an account link confirmation message, the account link confirmation message confirming approval of the account link request and providing instructions for access to the first account data.

Embodiments of the present disclosure provide a method for controlling data access, comprising: establishing a database storing information for a plurality of accounts comprising, for a first account associated with a first account holder, a first account identifier, first account data and data control parameters, and, for a second account associated with a second account holder, a second account identifier; providing a contactless card comprising a communications interface, a processor, and a memory, the memory storing an applet and a token, wherein the communications interface is configured to support at least one of near field communication, Bluetooth, or Wi-Fi, and wherein the contactless card is associated with the first account holder; and providing a client application comprising instructions for execution on at least one of a first client device of the first account holder or a second client device of the second account holder, the client application configured to: when executed on the second client device: in response to a tap action between the contactless card and the second client device: receive the token from the contactless card, and transmit to the server the token and an account link request to link the first account with the second account; and receive from the server an account link confirmation message including instructions for access to the first account data, the data access provided according to the data control parameters; and, when executed on the first client device: determine a tap action between the contactless card and the first client device, the tap action in response to a link approval request to approve the account link request, the tap action indicating approval of the account link request; and transmit to the server a link approval message approving the account link request.

Further features of the disclosed design, and the advantages offered thereby, are explained in greater detail hereinafter with reference to specific example embodiments described below and illustrated in the accompanying drawings.

BRIEF DESCRIPTION OF THE DRAWINGS

FIG. 1B is a diagram illustrating a sequence for providing data access control according to one or more example embodiments.

DETAILED DESCRIPTION

The following description of embodiments provides non-limiting representative examples referencing numerals to particularly describe features and teachings of different aspects of the invention. The embodiments described should be recognized as capable of implementation separately, or in combination, with other embodiments from the description of the embodiments. A person of ordinary skill in the art reviewing the description of embodiments should be able to learn and understand the different described aspects of the invention. The description of embodiments should facilitate understanding of the invention to such an extent that other implementations, not specifically covered but within the knowledge of a person of skill in the art having read the description of embodiments, would be understood to be consistent with an application of the invention.

Exemplary embodiments of the disclosed systems and methods provide for controlling data access through the interaction of a short-range transceiver, such as a contactless card, with a client device. Data access control may be provided in the context of controlling access to account information. Requests to link a first account with a second account may be handled via the interaction of a short-range transceiver, such as a contactless card, with a client device such that disclosure of certain account identifier information, or account login information, need not be disclosed to individuals or entities requesting access to account data of another individual or entity. Benefits of the disclosed technology may include improved data security for account information, improved fraud prevention, and improved user experience.

Figure 1A:
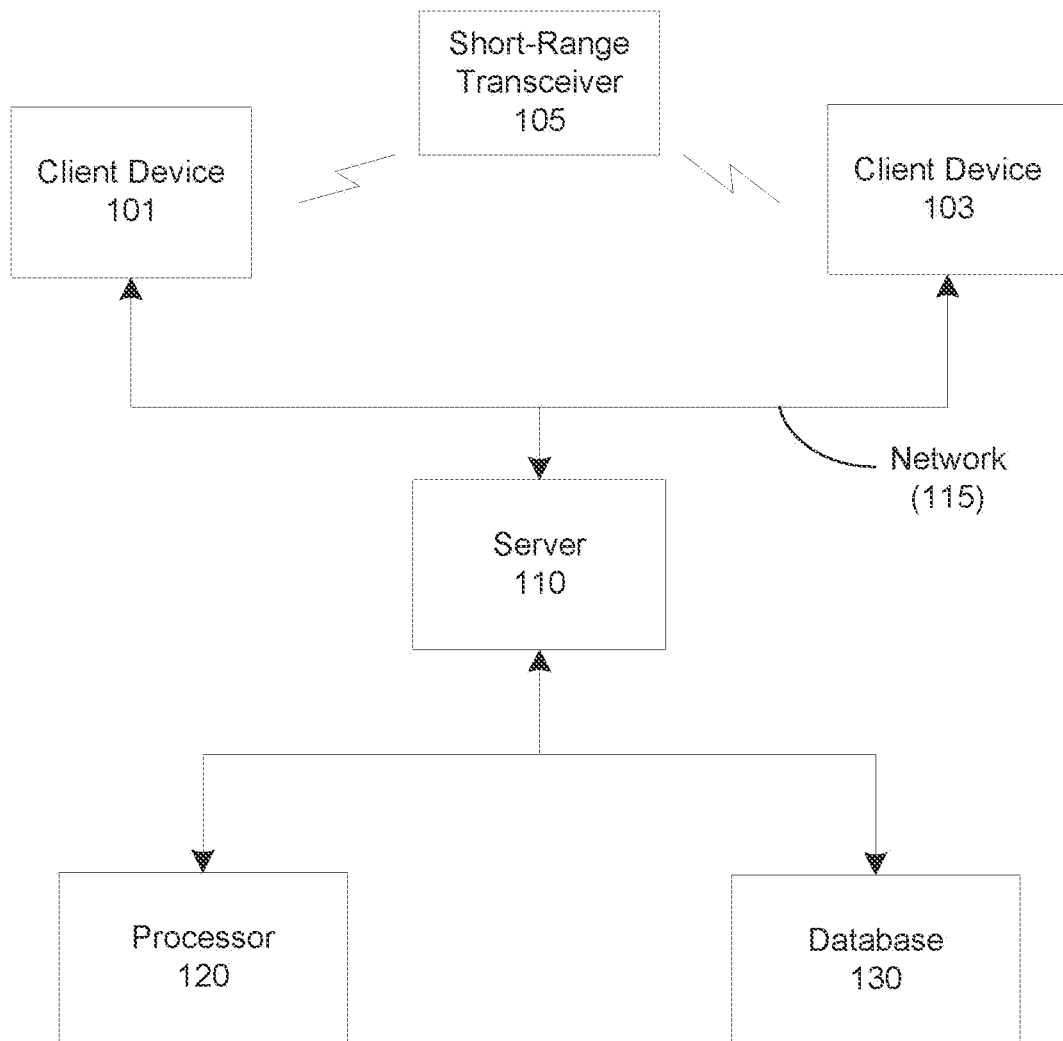
FIG. 1A is a diagram of a data access control system according to one or more example embodiments.

FIG. 1A shows a diagram illustrating a data access control system 100 according to one or more example embodiments. As discussed further below, system 100 may include client device 101, client device 103, short-range transceiver 105, server 110, processor 120 and database 130. Client device 101 and client device 103 may communicate with server 110 via network 115. Although FIG. 1 illustrates certain components connected in certain ways, system 100 may include additional or multiple components connected in various ways.

System 100 may include one or more client devices, such as client device 101 and/or client device 103, which may each be a network-enabled computer. As referred to herein, a network-enabled computer may include, but is not limited to a computer device, or communications device including, e.g., a server, a network appliance, a personal computer, a workstation, a phone, a handheld PC, a personal digital assistant, a thin client, a fat client, an Internet browser, or other device. Each of client devices 101 and 103 also may be a mobile device; for example, a mobile device may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device. Additional features that may be included in a client device, such as client device 101 and/or client device 103, are further described below with reference to FIG. 2.

System 100 may include one or more short-range transceivers, such as short-range transceiver 105. Short-range transceiver 105 may be in wireless communication with a client device, such as client device 101 and/or client device 103, within a short-range communications field such as, for example, near field communication (NFC). Short-range transceiver 105 may include, for example, a contactless card, a smart card, or may include a device with a varying form factor such as a fob, pendant or other device configured to communicate within a short-range communications field. In other embodiments, the short-range transceiver 105 may be the same or similar as the client devices 101, 103. Additional features that may be included in a short-range transceiver, such as such as short-range transceiver 105, are further described below with reference to FIG. 3.

System 100 may include one or more servers 110. In some example embodiments, server 110 may include one or more processors (such as, e.g., a microprocessor) which are coupled to memory. Server 110 may be configured as a central system, server or platform to control and call various data at different times to execute a plurality of workflow actions. Server 110 may be a dedicated server computer, such as bladed servers, or may be personal computers, laptop computers, notebook computers, palm top computers, network computers, mobile devices, or any processor-controlled device capable of supporting the system 100.

Server 110 may be configured for data communication (such as, e.g., via a connection) with one or more processors, such as processor 120. In some example embodiments, server 110 may incorporate processor 120. In some example embodiments, server 110 may be physically separate and/or remote from processor 120. Processor 120 may be configured to serve as a back-end processor. Processor 120 may be configured for data communication (such as, e.g., via a connection) with database 130 and/or server 110. Processor 120 may include one or more processing devices such as a microprocessor, RISC processor, ASIC, etc., along with associated processing circuitry. Processor 120 may include, or be connected to, memory storing executable instructions and/or data. Processor 120 may communicate, send or receive messages, requests, notifications, data, etc. to/from other devices, such as client devices 101 and/or 103, via server 110.

Server 110 may be configured for data communication (such as, e.g., via a connection) with one or more databases, such as database 130. Database 130 may be a relational or non-relational database, or a combination of more than one database. In some example embodiments, server 110 may incorporate database 130. In some example embodiments, database 130 may be physically separate and/or remote from server 110, located in another server, on a cloud-based platform, or in any storage device that is in data communication with server 110.

Connections between server 110, processor 120 and database 130 may be made via any communications line, link or network, or combination thereof, wired and/or wireless, suitable for communicating between these components. Such network may include network 115 and/or one or more networks of same or similar type as those described herein with reference to network 115. In some example embodiments, connections between server 110, processor 120 and database 130 may include a corporate LAN.

Server 110 and/or database 130 may include user login credentials used to control access to user accounts. The login credentials may include, without limitation, user names, passwords, access codes, security questions, swipe patterns, image recognition, identification scans (e.g., driver's license scan and passport scan), device registrations, telephone numbers, email addresses, social media account access information, and biometric identification (e.g., voice recognition, fingerprint scans, retina scans, and facial scans).

Database 130 may contain data relating to one or more accounts. Accounts may be maintained by (or on behalf of) and/or relate to any one or more of a variety of entities, such as, for example (and without limitation) a bank, merchant, online retailer, service provider, merchandizer, manufacturer, social media provider, provider or promoter of sporting or entertainment events, or hotel chain. For example, database 130 may include, without limitation, account identification information (e.g., account number, account owner identification number, account owner name and contact information—any one or more of which may comprise an account identifier), account characteristics (e.g., type of account, funding and trading limitations, and restrictions on access and other activity), and may include data pertinent to the account, including financial (such as balance information, payment history, and transaction history), social and/or personal information. Data stored in database 130 may be stored in any suitable format, and may be encrypted and stored in a secure format to prevent unauthorized access. Any suitable algorithm/procedure may be used for data encryption and for authorized decryption.

Server 110 may be configured to communicate with one or more client devices, such as such as client device 101 and/or client device 103, via one or more networks, such as network 115. Network 115 may include one or more of a wireless network, a wired network or any combination of wireless network and wired network, and may be configured to connect client devices 101 and/or 103 to server 110. For example, network 115 may include one or more of a fiber optics network, a passive optical network, a cable network, an Internet network, a satellite network, a wireless local area network (LAN), a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 802.11b, 802.15.1, 802.11n and 802.11g, Bluetooth, NFC, Radio Frequency Identification (RFID), Wi-Fi, and/or the like.

In addition, network 115 may include, without limitation, telephone lines, fiber optics, IEEE Ethernet 902.3, a wide area network, a wireless personal area network, a LAN, or a global network such as the Internet. In addition, network 115 may support an Internet network, a wireless communication network, a cellular network, or the like, or any combination thereof. Network 115 may further include one network, or any number of the exemplary types of networks mentioned above, operating as a stand-alone network or in cooperation with each other. Network 115 may utilize one or more protocols of one or more network elements to which they are communicatively coupled. Network 115 may translate to or from other protocols to one or more protocols of network devices. Although network 115 is depicted as a single network, it should be appreciated that according to one or more example embodiments, network 115 may comprise a plurality of interconnected networks, such as, for example, the Internet, a service provider's network, a cable television network, corporate networks, such as credit card association networks, a LAN, and/or home networks.

In some example embodiments, server 110 may access records, including records in database 130, to determine a method or methods for communicating with client device 101 and/or client device 103. The communication method may include an actionable push notification with an application stored on client device 101 and/or client device 103. Other communication methods may include a text message or an e-mail, or other messaging techniques appropriate in a network-based client/server configuration. Messages or requests by client devices 101 and/or 103 may be communicated to server 110 via an application on the client device, or may be sent by a text message or an e-mail, or other messaging techniques appropriate in a network-based client/server configuration. Communications originating with client device 101 or client device 103 may be sent to server 110 using the same communications method as communications originating with server 110, or via a different communications method.

FIG. 1B shows a diagram illustrating a sequence for providing data access control according to one or more example embodiments, which may include a request to link two accounts, each account held by separate account holders. FIG. 1B references similar components of example embodiment system 100 as illustrated in FIG. 1A. Client device 101 may be associated with a first account holder. The first account holder may have an associated first account, which may include a first account identifier and first account data. Client device 101 may include application 102, which may include instructions for execution by client device 101. Client device 101 may include features further described below with reference to FIG. 2. Application 102 may be configured to provide a user interface for the first account holder when using client device 101. Application 102 may be configured to communicate, via client device 101, with other client devices, with short-range transceiver 105, and with server 110. Application 102 may be configured to receive requests and send messages as described herein with reference to client device 101. Account information, including account identifiers and account data, may be stored in database 130.

Client device 103 may be associated with a second account holder. The second account holder may have an associated second account, which may include a second account identifier. Client device 103 may include application 104, which may include instructions for execution by client device 103. Client device 103 may include features further described below with reference to FIG. 2. Application 104 may be configured to provide a user interface for the second account holder when using client device 103. Application 104 may be configured to communicate, via client device 103, with other client devices, with short-range transceiver 105, and with server 110. Application 104 may be configured to send requests and receive messages as described herein with reference to client device 103.

Short-range transceiver 105 may be associated with the first account holder. Short-range transceiver 105 may include, for example, a contactless card, and may include features further described below with reference to FIG. 3. Short-range transceiver 105 may have memory storing an applet 106 and/or a token 107, token 107 being associated with the first account holder.

A token may be used to increase security through token authorization. Server 110 may send a validation request to client device 101 and/or 103, receive responsive information from client device 101 and/or 103, and if validated, send a validation token back to client device 101 and/or 103. The validation token may be based on a pre-determined token, or may be a dynamic token based on an algorithm that can be secret and known only to server 110 and client device 101 and/or 103; the algorithm may include live parameters independently verifiable by the participants, such as the temperature at a particular location or the time. The token may be used to verify the identity of the first account holder or the second account holder. The validation request and/or validation token may be based on token 107 stored on short-range transceiver 105.

In some example embodiments, application 104 may display an instruction on client device 103 prompting the second account holder to initiate a tap action between short-range transceiver 105 and client device 103. As used herein, a tap action may include tapping short-range transceiver 105 against client device 103 (or vice-versa). For example, if short-range transceiver 105 is a contactless card and client device 103 is a mobile device, the tap action may include tapping the contactless card on a screen or other portion of client device 103. However, a tap action is not limited to a physical tap by short-range transceiver 105 against client device 103, and may include other gestures, such as, e.g., a wave or other movement of short-range transceiver 105 in the vicinity of client device 103 (or vice-versa).

At label 150, there may be a tap action between short-range transceiver 105 and client device 103. The tap action may be in response to a prompt displayed on client device 103.

At label 152, application 104 may communicate (via client device 103) with short-range transceiver 105 (e.g., after short-range transceiver 105 is brought near client device 103). Communication between application 104 and short-range transceiver 105 may involve short-range transceiver 105 (such as, e.g., a contactless card) being sufficiently close to a card reader (not shown) of the client device 103 to enable NFC data transfer between application 104 and short-range transceiver 105, and may occur in conjunction with (or response to) a tap action between short-range transceiver 105 and client device 103 (such as, e.g., the tap action at label 150). The communication may include exchange of data or commands to establish a communication session between application 104 and short-range transceiver 105. The exchange of data may include transfer or exchange of one or more keys, which may be preexisting keys or generated as session keys. In some example embodiments, the communication may occur upon entry of short-range transceiver 105 into a short-range communication field of client device 103 prior to a tap action between short-range transceiver 105 and client device 103.

At label 154, short-range transceiver 105 may send token 107 associated with the first account holder to application 104. Token 107 may include the first account identifier, which may be unique to a specific user account. In an example embodiment, token 107 may include an identifier unique to the first account holder, but not to a specific account; in which case if the first account holder has more than one account, the second account holder would need to select the account to be linked. In some example embodiments, token 107 may include a key associated with the first account holder. In some example embodiments, the sending of token 107 to application 104 may be in conjunction with (or response to) a tap action between short-range transceiver 105 and client device 103 (such as, e.g., the tap action at label 150). In some example embodiments, the sending of token 107 to application 104 may occur upon entry of short-range transceiver 105 into a short-range communication field of client device 103 prior to a tap action between short-range transceiver 105 and client device 103.

At label 156, application 104 may send token 107 to server 110, along with an account link request to link the first account (associated with the first account holder) with the second account (associated with the second account holder). This may be carried out in response to a tap action between short-range transceiver 105 and client device 103 (such as, e.g., the tap action at label 150).

At label 158, processor 120 may receive (e.g., via server 110) the token and the account link request. Processor 120 may use the token to identify the first account associated with the first account holder. In some example embodiments, identifying the first account may be carried out by using the first account identifier in the token to look up account information in database 130. In some example embodiments, at label 159, if the token includes the key associated with the first account holder, processor 120 may use the key in the token to authenticate the first account holder as the first account holder associated with short-range transceiver 105.

At label 160, processor 120 may send (e.g., via server 110) a link approval request to client device 101, requesting that the first account holder approve the account link request, by the second account holder, to link the first account with the second account. The link approval request may include, for example, the name of the second account holder, and any information or instructions required by the first account holder to consider the request. The link approval request may include a notice that the first account holder may approve or deny the request. The link approval request may be sent as a push notification to application 102 (via client device 101). In some example embodiments, application 102 may display an instruction on client device 101 prompting the first account holder to initiate a tap action between short-range transceiver 105 and client device 101.

At label 162, there may be a tap action between short-range transceiver 105 and client device 101. The tap action may be responsive to the link approval request (and/or to a prompt displayed on client device 101), and may indicate approval by the first account holder of the account link request.

At label 164, application 102 may send a link approval message to the server, indicating approval by the first account holder of the account link request. This may be carried out in response to a tap action between short-range transceiver 105 and client device 101 (such as, e.g., the tap action at label 162). In an example embodiment, application 102 may instead send a denial message (not shown) to the server, indicating denial by the first account holder of the account link request.

At label 166, processor 120 may send (e.g., via server 110) a link confirmation message to client device 103, confirming approval of the request to link the first account with the second account. The link confirmation message may be sent as a push notification to application 104 (via client device 103). In some example embodiments, information for the first account and/or the second account in database 130 may be updated with the permission granted by the first account holder to link the first and second accounts.

In an example embodiment, processor 120 may instead send a denial notification (not shown) to client device 103, indicating denial by the first account holder of the account link request.

At label 168, processor 120 may send (e.g., via server 110) to client device 103 instructions for obtaining access to first account data in the first account. The instructions for access to the first account data may be included with the link confirmation message (at label 166), or may be sent as part of a separate communication, including a push notification to application 104.

Processor 120 may retrieve the requested first account data from database 130 and transmit the data to client device 103. Processor 120 may encrypt the requested first account data, prior to transmission to client device 103, using any suitable encryption method, such as Triple DES, RSA public-key private-key encryption, asymmetric encryption, Blowfish encryption, Twofish encryption, Advanced Encryption Standard (AES), quantum key distribution, Honey Encryption, etc. In some embodiments, the requested first account data may already be encrypted as stored in database 130 prior to retrieval by processor 120.

Upon receipt of the requested first account data, client device 103 may decrypt the information, if the information was encrypted prior to transmission by processor 120. Client device 103 may receive a decryption key separate from the first communication of encrypted first account data. The encryption may allow for control of access to first account data according to data control parameters. For example, the first account data may be encrypted in a manner that requires a new key to be requested by client device 103 from processor 120 each time client device 103 desires to gain access to the first account data, such that the data would need to be decrypted for each access by client device 103; this procedure would permit processor 120 to keep track of and ensure that the first account data is not accessed in a manner inconsistent with data control parameters.

In an example embodiment, the second account holder may login to the second account and, via data sharing on the backend, obtain access to first account data, in accordance with any data control parameters.

Application 104 executing on client device 103 may through the use of application programming interfaces (APIs), perform the steps of sending and receiving messages and requests with server 110/processor 120. Application 104 may be configured to receive, decrypt, and access the requested first account data. Through interaction with application 104, processor 120 may monitor access of the requested first account data by client device 103, including in accordance with data control parameters. For example, processor 120 may through interaction with application 104 determine the number of times client device 103 has obtained access to the requested first account data, or the period(s) of time such access occurred. In some embodiments, application 104 may be permitted to store the requested first account data on a time-limited, or limited number of uses, basis.

In an example embodiment, processor 120 may be configured to determine whether the first account is eligible to be linked with the second account. Eligibility for account linking may be based on, for example, the type of accounts involved (e.g., business accounts), or identity of the account holders (e.g., family members or members of the same business entity). Eligibility may also be based on whether the first account holder has previously approved or revoked approval of account linking, or whether requested access would violate data control parameters (discussed further below). Eligibility for account linking may, e.g., be indicated in a flag stored in database 130 or in memory of short-range transceiver 105.

In one or more example embodiments, access by the second account holder to first account data may be limited in accordance with data control parameters. In an example embodiment, data control parameters may be stored in database 130 with the first account information. Application 102 may provide an interface for the first account holder to select the data control parameters stored in database 130. The selected data control parameters may be stored in database 130 and may be applied to limit access by the second account holder to first account data. Application 102 may also transmit the selected data control parameters to short-range transceiver 105. In an example embodiment, data control parameters may be stored in memory of short-range transceiver 105. Data control parameters stored in memory of short-range transceiver 105 may be sent to application 104 and used by application 104 to limit access by the second account holder to first account data. Applet 106 may be configured to receive the data control parameters and store the data control parameters in memory of short-range transceiver 105. Applet 106 may be further configured to transmit the data control parameters to client device 103. In some example embodiments, the first account holder may select data control parameters at the time of approving the request to link accounts, and application 102 may transmit the selected data control parameters to server 110 along with the link approval message. The selected data control parameters may be stored in database 130 and may be applied to limit access by the second account holder to first account data.

In one or more example embodiments, data control parameters may be used to limit access by the second account holder to first account data in one or more ways. For example, the data control parameters may permit access only for a specific or limited period of time. As another example, the data control parameters may permit access to a single use by the second account holder. As another example, the data control parameters may permit access for an unlimited period of time, unless the first account holder revokes the approval of the request to link the first account with the second account. As another example, the data control parameters may permit access only to portions of first account data corresponding to a predefined category. As another example, the data control parameters may provide different access permissions based on the identity of the second account holder. As another example, the data control parameters may permit access only when short-range transceiver 105 is detected within range of a short-range communication field of client device 103. In some example embodiments, each time the second account holder attempts to access first account data after account linking approval is obtained, processor 120 may check to determine whether such access is permitted based on data control parameters and any revocation by the first account holder.

In an example embodiment, application 104 may be launched in response to a tap action between short-range transceiver 105 and client device 103. In an example embodiment, application 102 may be launched in response to a tap action between short-range transceiver 105 and client device 101.

Figure 2:
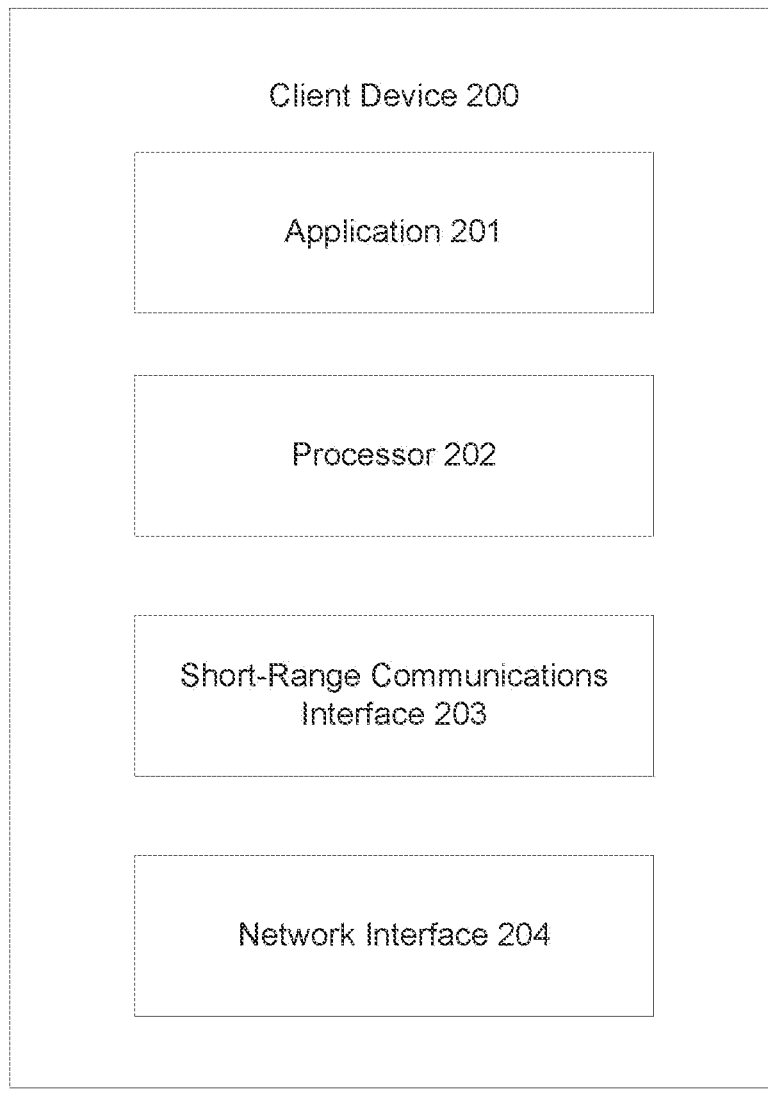
FIG. 2 illustrates components of a client device used in a data access control system according to one or more example embodiments.

FIG. 2 illustrates components of a client device 200 used in a data access control system according to one or more example embodiments. In one or more example embodiments, client device 200 may be one or more of client devices 101 and/or 103, described above with reference to FIG. 1A and FIG. 1B. Client device 200 may include one or more applications 201, one or more processors 202, a short-range communications interface 203, and a network interface 204. Application 201 may include a software application or executable program code to be executed on processor 202 and configured to carry out features described herein for any of the client devices, such as client devices 101 and/or 103, and/or any of the features described herein with reference to application 102. Application 201 may be configured, for example, to transmit and/or receive data with other devices via client device 200, such as via short-range communications interface 203 and/or network interface 204. For example, application 201 may be configured to initiate one or more requests, such as near field data exchange requests to a short-range transceiver (such as a contactless card). Application 201 may also be configured to provide a user interface via a display (not shown) for a user of the client device. Application 201 may be stored in memory in client device 200; the memory may include a read-only memory, write-once read-multiple memory and/or read/write memory, e.g., RAM, ROM, and EEPROM.

Processor 202 may include one or more processing devices such as a microprocessor, RISC processor, ASIC, etc., and may include associated processing circuitry. Processor 202 may include, or be connected to, memory storing executable instructions and/or data, as may be necessary or appropriate to control, operate or interface with the other features of client device 200, including application 201. Processor 202 (including any associated processing circuitry) may contain additional components including processors, memories, error and parity/CRC checkers, data encoders, anticollision algorithms, controllers, command decoders, security primitives and tamperproofing hardware, as necessary to perform the functions described herein.

Short-range communications interface 203 may support communication via a short-range wireless communication field, such as NFC, RFID, or Bluetooth. Short-range communications interface 203 may include a reader, such as a mobile device NFC reader. Short-range communications interface 203 may be incorporated into network interface 204, or may be provided as a separate interface.

Network interface 204 may include wired or wireless data communication capability. These capabilities may support data communication with a wired or wireless communication network, including the Internet, a cellular network, a wide area network, a local area network, a wireless personal area network, a wide body area network, any other wired or wireless network for transmitting and receiving a data signal, or any combination thereof. Such network may include, without limitation, telephone lines, fiber optics, IEEE Ethernet 902.3, a wide area network, a local area network, a wireless personal area network, a wide body area network or a global network such as the Internet.

Client device 200 may also include a display (not shown). Such display may be any type of device for presenting visual information such as a computer monitor, a flat panel display, or a mobile device screen, including liquid crystal displays, light-emitting diode displays, plasma panels, and cathode ray tube displays.

Client device 200 may also include one or more device inputs (not shown). Such inputs may include any device for entering information into the client device that is available and supported by the client device 300, such as a touch-screen, keyboard, mouse, cursor-control device, touch-screen, microphone, digital camera, video recorder, or camcorder. The device inputs may be used to enter information and interact with the client device 200 and, by extension, with the systems described herein.

Figure 3:
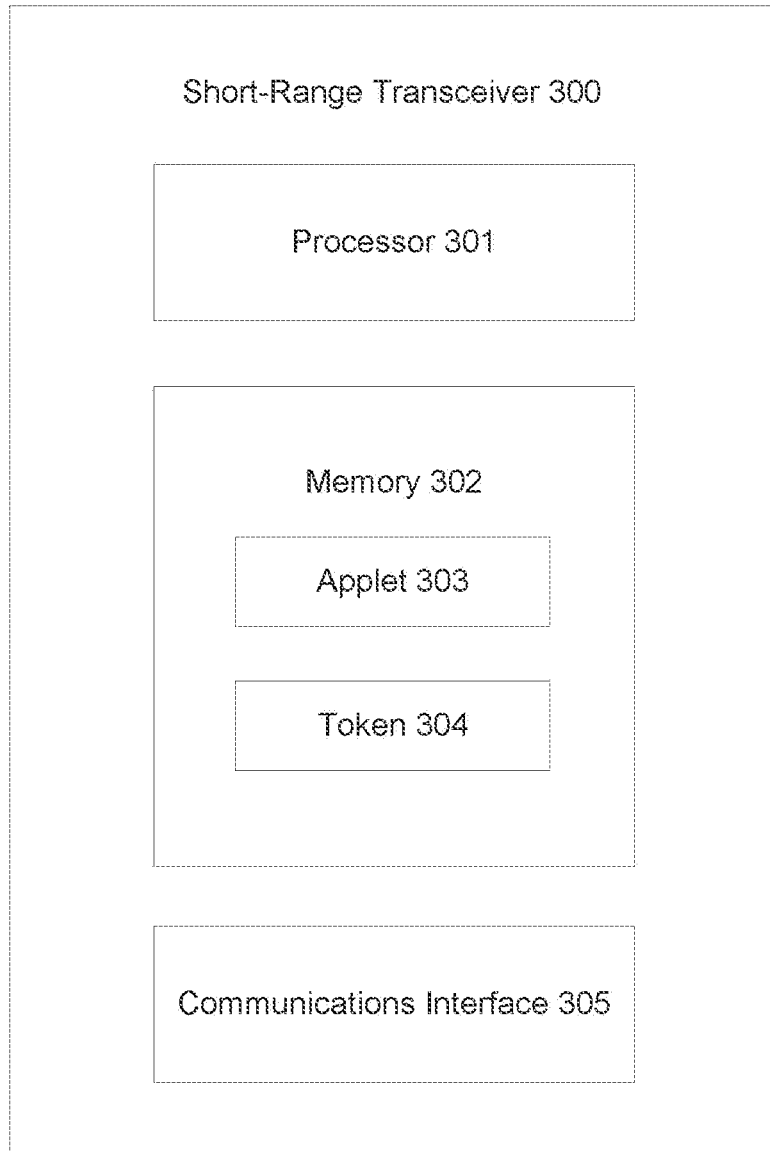
FIG. 3 illustrates components of a short-range transceiver used in a data access control system according to one or more example embodiments.

FIG. 3 illustrates components of a short-range transceiver 300 used in a data access control system according to one or more example embodiments. In one or more example embodiments, short-range transceiver 300 may be one or more of short-range transceiver 105, described above with reference to FIG. 1A and FIG. 1B. Short-range transceiver 300 may include, for example, a contactless card, or may include a device with a varying form factor such as a fob, pendant or other device configured to communicate within a short-range communications field. Short-range transceiver 300 may include a processor 301, memory 302, and short-range communications interface 305.

Processor 301 may include one or more processing devices such as a microprocessor, RISC processor, ASIC, etc., and may include associated processing circuitry. Processor 301 may include, or be connected to, memory storing executable instructions and/or data, as may be necessary or appropriate to control, operate or interface with the other features of short-range transceiver 300, including applet 303. Processor 301 (including any associated processing circuitry) may contain additional components including processors, memories, error and parity/CRC checkers, data encoders, anticollision algorithms, controllers, command decoders, security primitives and tamperproofing hardware, as necessary to perform the functions described herein.

Memory 302 may be a read-only memory, write-once read-multiple memory or read/write memory, e.g., RAM, ROM, and EEPROM. Memory 302 may be configured to store one or more applets 303, and one or more tokens 304. Applet 303 may comprise one or more software applications configured to execute on processor 301, such as a Java Card applet that may be executable on a contactless card. However, it is understood that applet 303 is not limited to Java Card applets, and instead may be any software application operable on contactless cards or other devices having limited memory. Applet 303 may be configured to respond to one or more requests, such as near field data exchange requests from a client device, including requests from a device having a reader such as a mobile device NFC reader. Applet 303 may be configured to read (or write) data, including token 304, from (or to) memory 302 and provide the data, including token 304, in response to a request.

Token 304 may include a unique alphanumeric identifier assigned to a user of the short-range transceiver 300, and the identifier may distinguish the user of the short-range transceiver 300 from other users of other short-range transceivers (such as other contactless card users). In some example embodiments, token 304 may identify both a customer and an account assigned to that customer and may further identify the short-range transceiver (such as a contactless card) associated with the customer's account. In some example embodiments, token 304 may include a key unique to the user or customer with which the short-range transceiver is associated.

Short-range communications interface 305 may support communication via a short-range wireless communication field, such as NFC, RFID, or Bluetooth. Short-range transceiver 300 may also include one or more antennas (not shown) connected to short-range communications interface 305 to provide connectivity with a short-range wireless communications field.

Figure 4:
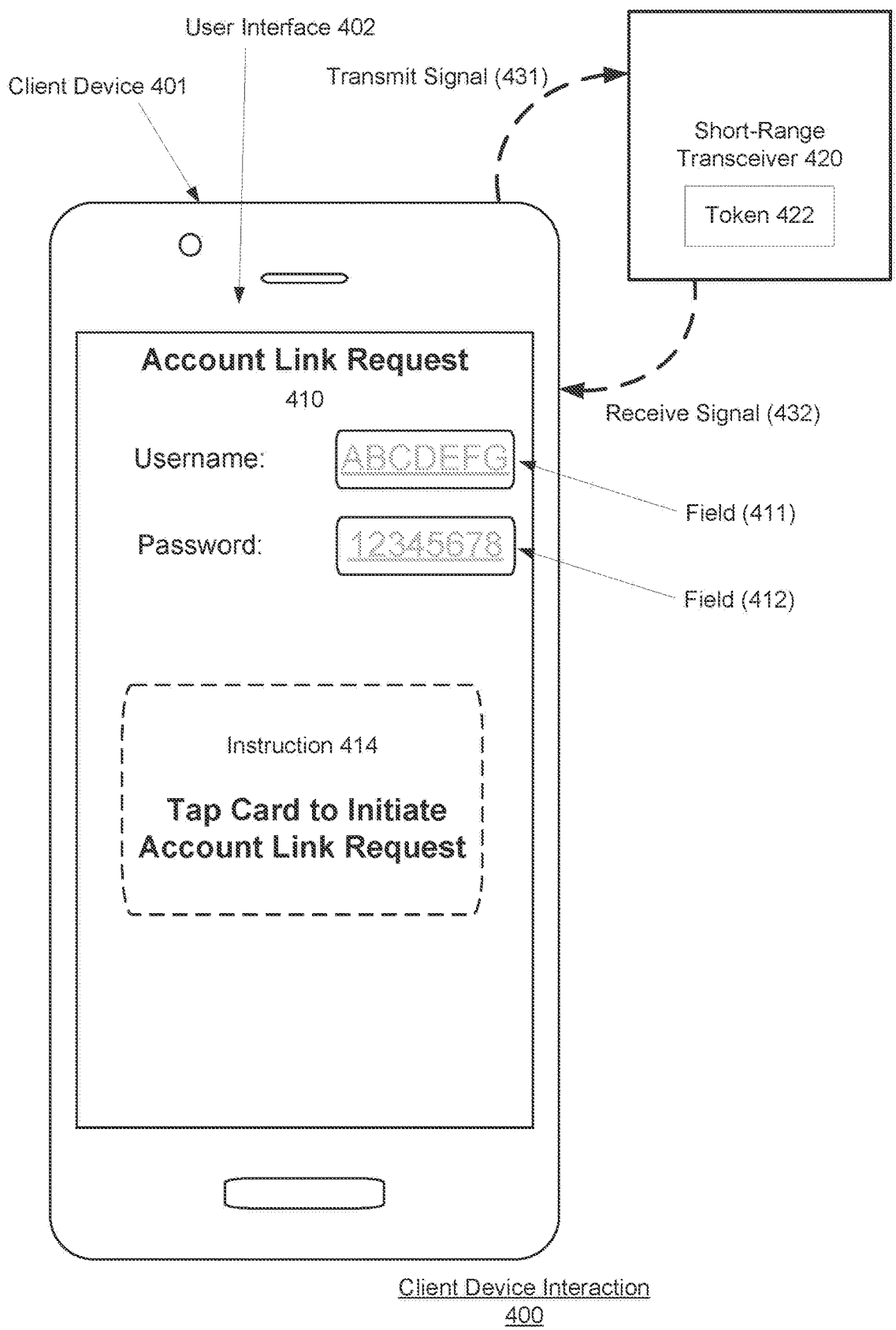
FIG. 4 is diagram illustrating interaction between a client device and a short-range transceiver used in a data access control system according to one or more example embodiments.

FIG. 4 is diagram illustrating the interaction 400 between a client device 401 and a short-range transceiver 420 used in a data access control system according to one or more example embodiments, including embodiments described above with reference to FIGS. 1A-1B. Client device 401 may be client device 103 described above with reference to FIG. 1A and FIG. 1B. Client device 401 may be associated with the second account holder. User interface 402 may be generated by application 104 described above with reference to FIG. 1B. Short-range transceiver 420 may be short-range transceiver 105 described above with reference to FIG. 1A and FIG. 1B. Upon entry of short-range transceiver 420 into a short-range communication field of client device 401 (such as, e.g., via a tap action), client device 401 may communicate with short-range transceiver 420. Client device 401 may send data or commands to short-range transceiver 420 via transmit signal 431, and may receive data from short-range transceiver 420, including token 422, via receive signal 432. Communication between client device 401 and short-range transceiver 420 may proceed as described above with reference to FIG. 1B (e.g., client device 101 or 103 and short-range transceiver 105).

User interface 402 may present on client device 401 a screen display for an account link request 410, which may include field 411 and field 412. If necessary, the second account holder may enter a username in field 411 and password in field 412. The screen display may include an instruction 414 prompting the second account holder to tap short-range transceiver 420 (in the example shown, short-range transceiver 420 may be a contactless card) to initiate an account link request to link the first account with the second account. Instruction 414 may be a push notification from server 110 (shown in FIGS. 1A and 1B). Client device 401 may transmit an account link request to server 110 (shown in FIG. 1A and FIG. 1B) in response to a tap action.

Figure 5:
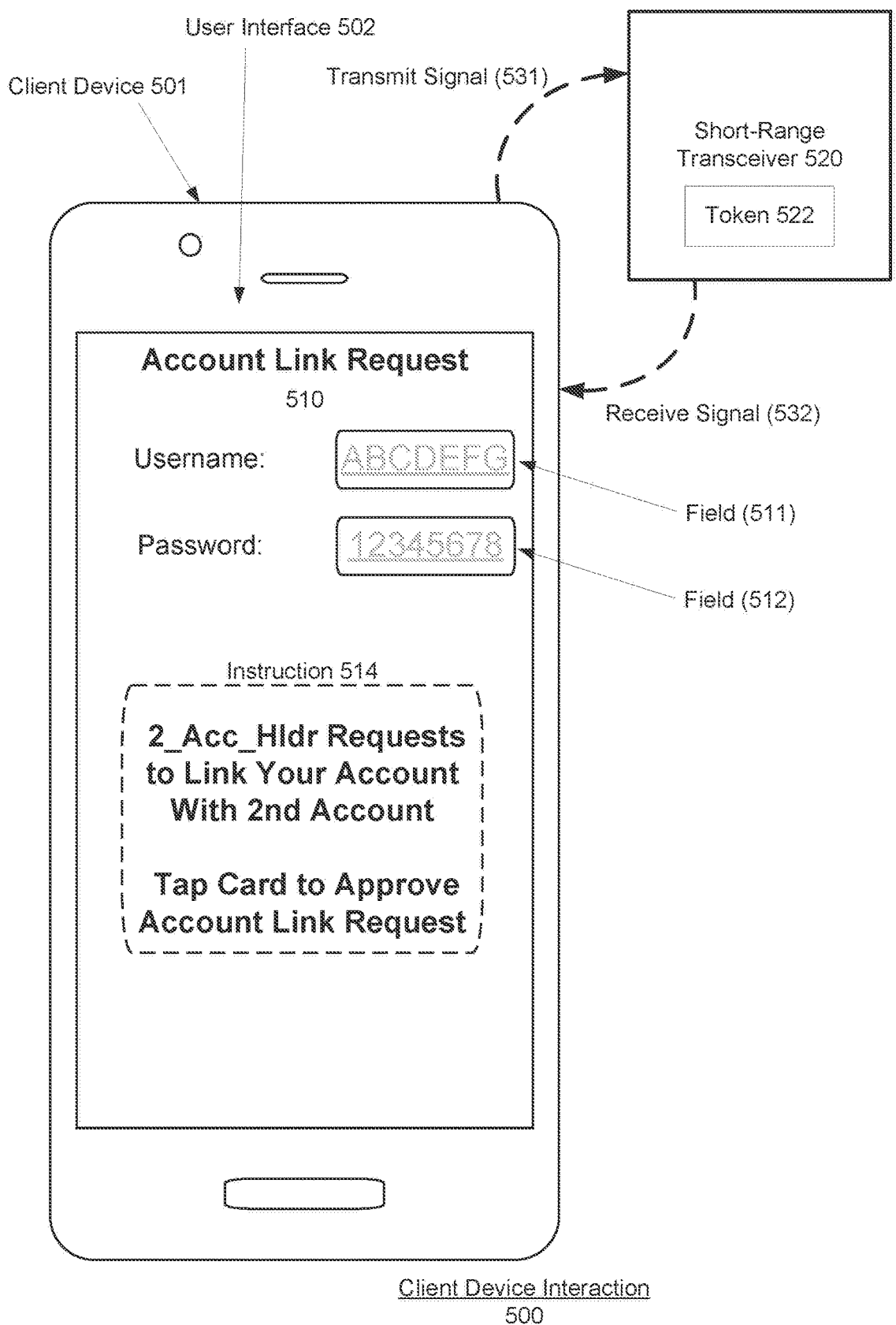
FIG. 5 is diagram illustrating interaction between a client device and a short-range transceiver used in a data access control system according to one or more example embodiments.

FIG. 5 is diagram illustrating the interaction 500 between a client device 501 and a short-range transceiver 520 used in a data access control system according to one or more example embodiments, including embodiments described above with reference to FIGS. 1A-1B. Client device 501 may be client device 101 described above with reference to FIG. 1A and FIG. 1B. Client device 501 may be associated with the first account holder. User interface 502 may be generated by application 102 described above with reference to FIG. 1B. Short-range transceiver 520 may be short-range transceiver 105 described above with reference to FIG. 1A and FIG. 1B. Upon entry of short-range transceiver 520 into a short-range communication field of client device 501 (such as, e.g., via a tap action), client device 501 may communicate with short-range transceiver 520. Client device 501 may send data or commands to short-range transceiver 520 via transmit signal 531, and may receive data from short-range transceiver 520, including token 522, via receive signal 532. Communication between client device 501 and short-range transceiver 520 may proceed as described above with reference to FIG. 1B (e.g., client device 101 or 103 and short-range transceiver 105).

User interface 502 may present on client device 501 a screen display for an account link request 510, which may include field 511 and field 512. If necessary, the first account holder may enter a username in field 511 and password in field 512. The screen display may include an instruction 514 notifying the first account holder that the second account holder (named 2_Acc_Hldr as shown in the example) has requested to link the first account with the second account, and prompting the first account holder to tap short-range transceiver 520 (in the example shown, short-range transceiver 520 may be a contactless card) to approve the account link request to link the first account with the second account. Instruction 514 may result from a push notification from server 110 (shown in FIG. 1A and FIG. 1B). Client device 501 may transmit an account link approval message to server 110 in response to a tap action. In some example embodiments, user interface 502 may provide the first account holder the option to select data control parameters at the time of approving the request to link accounts. Client device 501 may transmit the selected data control parameters to server 110 along with the link approval message; the selected data control parameters may be stored and may be applied to limit access by the second account holder to first account data, as discussed above.

Figure 6:
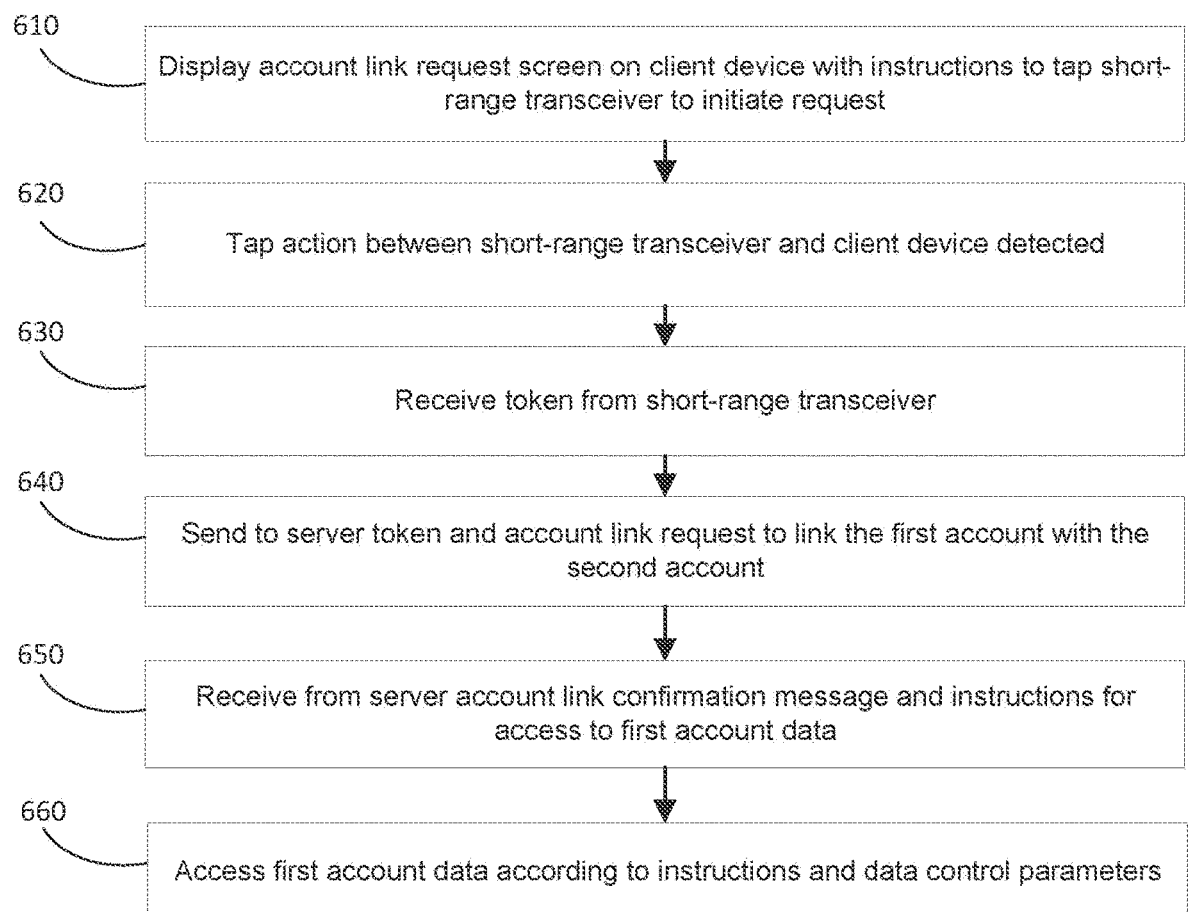
FIG. 6 is a flowchart illustrating a method of data access control according to one or more example embodiments.

FIG. 6 is a flowchart illustrating a method of data access control 600 according to one or more example embodiments, with reference to components and features described above including but not limited to the figures and associated description. Data access control method 600 may be carried out by application 104 executing on client device 103 associated with the second account holder. Short-range transceiver 105 is associated with the first account holder.

At block 610, application 104 may cause client device 103 to display an account link request screen (such as shown in, and described above with reference to, FIG. 4). The account link request screen may include an instruction to tap short-range transceiver 105 with/against client device 103 to initiate the account link request. As described above with reference to FIG. 4, short-range transceiver 420 (and, hence, short-range transceiver 105) may be a contactless card.

At block 620, a tap action may be detected between short-range transceiver 105 and client device 103.

At block 630, token 107 may be received from short-range transceiver 105. Receiving token 107 may be in response to the tap action of block 620. Token 107 may include the first account identifier. In some example embodiments, token 107 may include a key associated with the first account holder.

At block 640, token 107 may be transmitted to server 110 along with an account link request to link the first account with the second account. Transmission of token 107 and the account link request to server 110 may be in response to the tap action of block 620.

At block 650, an account link confirmation message may be received from server 110 along with instructions for access to first account data. As discussed above, the instructions may be part of the account link confirmation message, or part of a separate message.

At block 660, the second account holder may access the first account data according to the received instructions. As discussed above, in some example embodiments access to first account data may be only provided in accordance with data control parameters. In some example embodiments, the data control parameters are stored in database 130 with the first account information, and data access is limited by processor 120. In some example embodiments, the data control parameters are stored in memory of short-range transceiver 105 and are received by application 104 from short-range transceiver 105. In some example embodiments, the first account data may be encrypted prior to receiving instructions for access to the first account data. Decryption of the encrypted first account data may be performed using the key associated with the first account holder.

Figure 7:
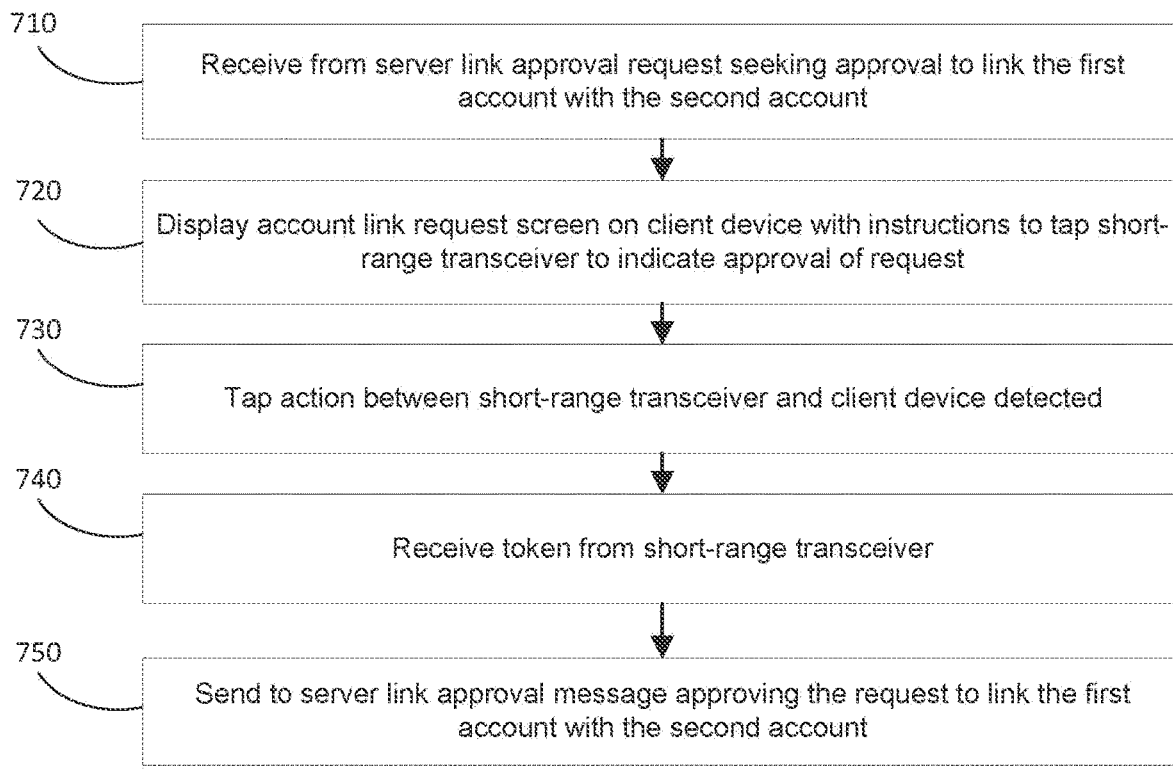
FIG. 7 is a flowchart illustrating a method of data access control according to one or more example embodiments.

FIG. 7 is a flowchart illustrating a method of data access control 700 according to one or more example embodiments, with reference to components and features described above including but not limited to the figures and associated description. Data access control method 700 may be carried out by application 102 executing on client device 101 associated with the first account holder. Short-range transceiver 105 is associated with the first account holder.

At block 710, a link approval request may be received from server 110 seeking approval to link the first account with the second account.

At block 720, application 102 may cause client device 101 to display an account link request screen (such as shown in, and described above with reference to, FIG. 5). The account link request screen may include an instruction to tap short-range transceiver 105 with/against client device 101 to approve the account link request. As described above with reference to FIG. 5, short-range transceiver 520 (and, hence, short-range transceiver 105) may be a contactless card.

At block 730, a tap action may be detected between short-range transceiver 105 and client device 101 indicating approval of the link approval request. The tap action may be responsive to the link approval request. In an example embodiment, approval may be indicated by other methods (such as, e.g. selecting a button).

At block 740, token 107 may be received from short-range transceiver 105. Token 107 may include the first account identifier. In some example embodiments, token 107 may include a key associated with the first account holder.

At block 750, a link approval message may be sent to server 110 indicating approval of the request to link the first account with the second account.

Figure 8:
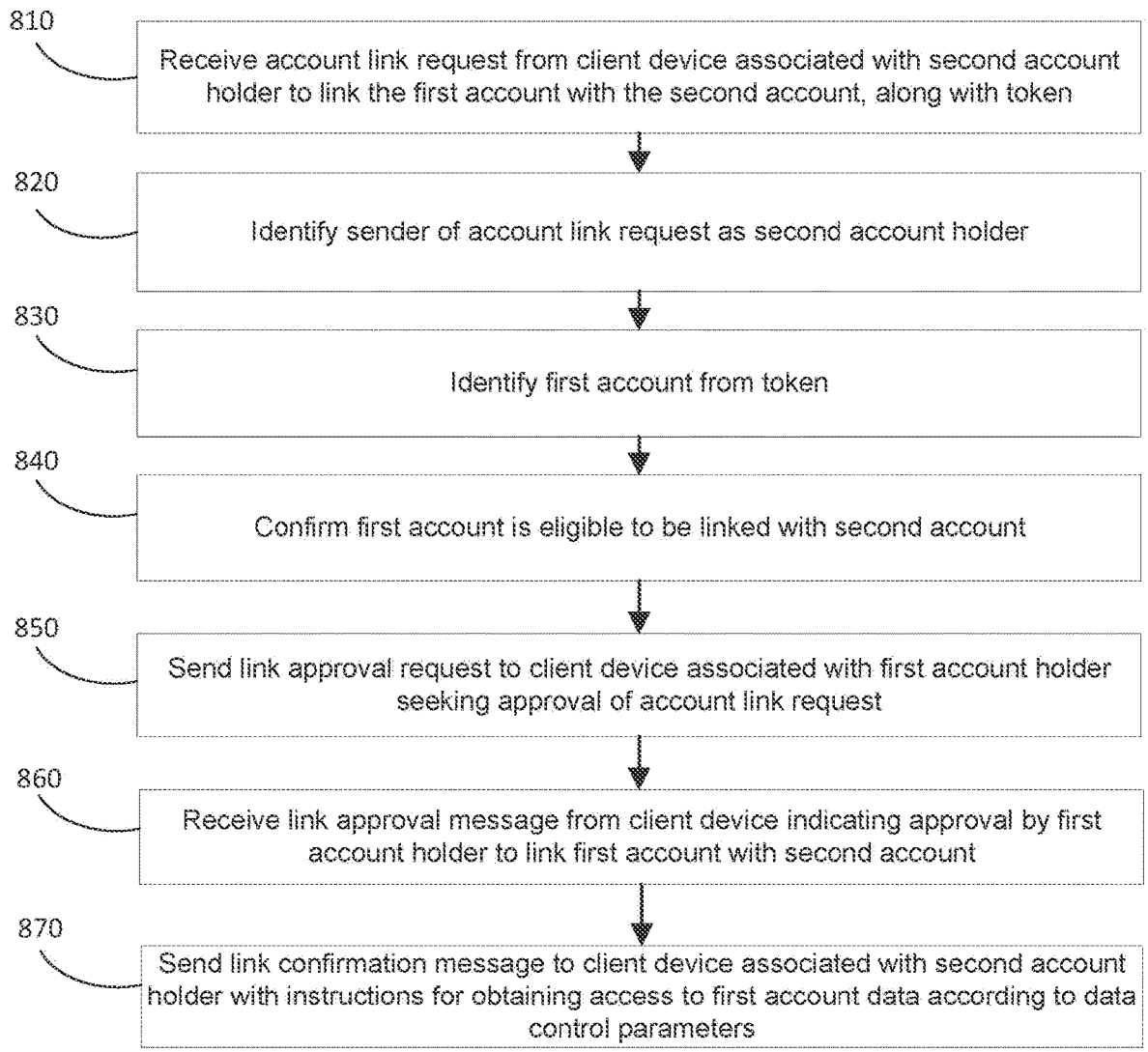
FIG. 8 is a flowchart illustrating a method of data access control according to one or more example embodiments.

FIG. 8 is a flowchart illustrating a method of data access control 800 according to one or more example embodiments, with reference to components and features described above including but not limited to the figures and associated description. Data access control method 800 may be carried out by processor 120 in communication with, via server 110, client device 101 associated with the first account holder and/or client device 103 associated with the second account holder.

At block 810 an account link request may be received, along with token 107, from client device 103 associated with the second account holder, requesting to link the first account with the second account. Token 107 may include the first account identifier. In some example embodiments, token 107 may include a key associated with the first account holder.

At block 820, the sender of the account link request may be identified as the second account holder.

At block 830, the first account may be identified based on received token 107. In some example embodiments, when token 107 includes the key associated with the first account holder, the key associated with the first account holder may be used to authenticate the first account holder.

At block 840, the processor may confirm that the first account is eligible to be linked with the second account. As discussed above with reference to FIG. 1B, eligibility for account linking may be based on, for example, the type of accounts involved (e.g., business accounts), or identity of the account holders (e.g., family members or members of the same business entity).

At block 850, a link approval request may be sent to client device 101 associated with the first account holder seeking approval to link the first account with the second account.

At block 860, a link approval message may be received from client device 101, indicating approval of the request to link the first account with the second account.

At block 870, an account link confirmation message may be sent to client device 103 associated with the second account holder, along with instructions for access to first account data. As discussed above, the instructions may be part of the account link confirmation message, or part of a separate message. In some example embodiments, access to first account data may be limited in accordance with data control parameters. In some example embodiments, processor 120 may encrypt the first account data prior to providing client device 103 instructions for access to the first account data. Encryption of the first account data may be performed using the key associated with the first account holder.

The description of embodiments in this disclosure provides non-limiting representative examples referencing figures and numerals to particularly describe features and teachings of different aspects of the disclosure. The embodiments described should be recognized as capable of implementation separately, or in combination, with other embodiments from the description of the embodiments. A person of ordinary skill in the art reviewing the description of embodiments should be able to learn and understand the different described aspects of the disclosure. The description of embodiments should facilitate understanding of the disclosure to such an extent that other implementations, not specifically covered but within the knowledge of a person of skill in the art having read the description of embodiments, would be understood to be consistent with an application of the disclosure Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "some examples," "other examples," "one example," "an example," "various examples," "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrases "in one example," "in one embodiment," or "in one implementation" does not necessarily refer to the same example, embodiment, or implementation, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A server, comprising:
a processor in data communication with a database storing information for a plurality of accounts, the database comprising, for a first account associated with a first account holder, a first account identifier and first account data, and, for a second account associated with a second account holder, a second account identifier,
wherein, upon receipt of an account link request and a token, the token comprising a key associated with a first account holder, the processor is configured to:
identify the first account based on the key,
transmit a link approval request to approve the account link request,
receive a link approval message approving the account link request, and
transmit an account link confirmation message including instructions for accessing the first account data.

2. The server of claim 1, wherein the processor is further configured to determine whether the first account is eligible for linking to the second account.

3. The server of claim 1, wherein the processor is further configured to authenticate the first account holder associated with the token as associated with a contactless card.

4. The server of claim 1, wherein the processor is further configured to:
retrieve at least a portion of the first account data from the database,
encrypt the at least a portion of the first account data to generate encrypted first account data, and
following transmission of the account link confirmation message, transmit the encrypted first account data.

5. The server of claim 4, wherein the processor is further configured to transmit, in a separate communication from the encrypted first account data, a decryption key.

6. The server of claim 5, wherein the decryption key is the key associated with the first account holder.

7. The server of claim 5, wherein a new decryption key is required for each transmission of encrypted first account data.

8. The server of claim 1, wherein:
the first account data includes one or more data control parameters, and
the processor is further configured to limit access to the first account data according to the data control parameters.

9. The server of claim 8, wherein the one or more data control parameters comprise at least one selected from the group of: permitting the second account holder to access the first account data only for a limited period of time; permitting the second account holder to access the first account data only for a single use; permitting the second account holder to access the first account data for an unlimited period of time unless the first account holder revokes the approval of the request to link the first account with the second account; and permitting the second account holder to access only portions of the first account data corresponding to a predefined category.

10. The server of claim 1, wherein the key is unique to the first account holder.

11. A method for controlling data access performed by a server in data communication with a database storing information for a plurality of accounts comprising, for a first account associated with a first account holder, a first account identifier, first account data, and, for a second account associated with a second account holder, a second account identifier, the method comprising:
receiving, via a network, an account link request to link the first account with the second account, the account link request accompanied by a token comprising a key associated with the first account holder;
identifying the first account based on the key;
transmitting, via the network, a link approval request to approve the account link request;
receiving, via the network, a link approval message generated in response to an indication by the first account holder approving the account link request; and
transmitting, via the network, an account link confirmation message, the account link confirmation message confirming approval of the account link request and providing instructions for access to the first account data.

12. The method of claim 11, wherein:
the first account data includes one or more data control parameters, and
the one or more data control parameters comprise at least one selected from the group of:
permitting the second account holder to access the first account data only for a limited period of time; permitting the second account holder to access the first account data only for a single use;
permitting the second account holder to access the first account data for an unlimited period of time unless the first account holder revokes the approval of the request to link the first account with the second account; and
permitting the second account holder to access only portions of the first account data corresponding to a predefined category.

13. The method of claim 12, wherein the data control parameters comprise different data access permissions based on the identity of the second account holder.

14. A system for data access control, comprising
a server in data communication with a database storing information for a plurality of accounts comprising, for a first account associated with a first account holder, a first account identifier, first account data, and, for a second account associated with a second account holder, a second account identifier; and
a contactless card associated with the first account holder and comprising a communications interface, a processor, and a memory, the memory storing an applet and a token,
wherein, after entry into a communication field, the contactless card is configured to transmit, via a network and one or more intermediary devices, an account link request to link the first account with the second account and a token, the token comprising a key associated with the first account holder, and
wherein there server is configured to:
receive from a first client device the token and the account link request;
identify the first account based on the key;
transmit a link approval request to approve the account link request;
receive a link approval message approving the account link request; and
transmit an account link confirmation message including instructions for access to the first account data.

15. The system for data access control of claim 14, comprising:
a client application comprising instructions for execution on at least one of the first client device or a second client device, the client application configured to:
when executed on the first client device:
in response to a tap action between the contactless card and the first client device:
receive the token from the contactless card, and transmit to the server the token and an account link request to link the first account with the second account; and
receive from the server an account link confirmation message including instructions for access to the first account data; and
when executed on the second client device:
in response to a link approval request from the server to approve the account link request, transmit to the server a link approval message approving the account link request.

16. The data access control system of claim 15, wherein:
the memory of the contactless card further stores one or more data control parameters for the first account, and
the client application is further configured to, when executed by the first client device:
receive from the contactless card one or more data control parameters for the first account; and
limit access by the first client device to the first account data according to the received one or more data control parameters.

17. The data access control system of claim 16, the one or more data control parameters comprise at least one selected from the group of: permitting the second account holder to access the first account data only for a limited period of time; permitting the second account holder to access the first account data only for a single use; permitting the second account holder to access the first account data for an unlimited period of time unless the first account holder revokes the approval of the request to link the first account with the second account; and permitting the second account holder to access only portions of the first account data corresponding to a predefined category.

18. The data access control system of claim 16, wherein the one or more data control parameters comprise different data access permissions based on the identity of the second account holder.

19. The data access control system of claim 15, wherein receipt by the server of the link approval message follows a tap action between the contactless card and the second client device.

20. The data access control system of claim 14, wherein the key is unique to the first account holder.

* * * * *